US011762054B2

(12) United States Patent
Cho

(10) Patent No.: US 11,762,054 B2
(45) Date of Patent: Sep. 19, 2023

(54) METHOD AND APPARATUS FOR POSITIONING

(71) Applicant: LOCAILA, INC, San Jose, CA (US)

(72) Inventor: Jaihyung Cho, Daejeon (KR)

(*) Notice: Subject to any disclaimer, the term of this patent is extended or adjusted under 35 U.S.C. 154(b) by 101 days.

(21) Appl. No.: 17/562,937

(22) Filed: Dec. 27, 2021

(65) Prior Publication Data

US 2023/0204708 A1 Jun. 29, 2023

(51) Int. Cl.
*G01S 5/02* (2010.01)
*G01S 5/10* (2006.01)

(52) U.S. Cl.
CPC .......... *G01S 5/0268* (2013.01); *G01S 5/0269* (2020.05); *G01S 5/10* (2013.01)

(58) Field of Classification Search
CPC ........ G01S 5/0268; G01S 5/0269; G01S 5/10; H04W 64/00; H04W 4/029
See application file for complete search history.

(56) References Cited

U.S. PATENT DOCUMENTS

| 6,208,297 B1* | 3/2001 | Fattouche | G01S 5/0246 |
| | | | 342/450 |
| 8,928,529 B2* | 1/2015 | Kee | G01S 5/02 |
| | | | 342/464 |
| 2008/0048913 A1* | 2/2008 | Macias | G01S 5/06 |
| | | | 342/463 |

* cited by examiner

*Primary Examiner* — Cassi J Galt

(57) ABSTRACT

Provided is a positioning method of a user equipment performed by the user equipment, the method including receiving reference signals from at least three transmitters; calculating a first phase difference between reference signals received from transmitters that belong to a first transmitter pair; calculating a second phase difference between reference signals received from transmitters that belong to a second transmitter pair; calculating a first position coordinate based on a first conversion coefficient set and the first phase difference; determining an integer ambiguity of the second phase difference based on a second conversion coefficient set, the second phase difference, and the first position coordinate; and determining a position of the user equipment based on the integer ambiguity of the second phase difference.

20 Claims, 12 Drawing Sheets

METHOD AND APPARATUS FOR POSITIONING

BACKGROUND

1. Field

The present disclosure of the following description relates to a positioning method and apparatus for measuring a position of a user equipment (UE) in a vertical direction.

2. Related Art

A communication system may include a core network (e.g., a mobility management entity (MME), a serving gateway (SGW), a packet data network (PDN) gateway (PGW), etc.), a base station (e.g., a macro base station, a small base station, a relay, etc.), a user equipment (UE), and the like. Communication between the base station and the UE may be performed using a variety of radio access technology (RAT), for example, 4-th generation (4G) communication technology, 5-th generation (5G) communication technology, wireless broadband (WiBro) technology, wireless local area network (WLAN) technology, and wireless personal area network (WPAN) technology.

A reference signal may be transmitted and received between a UE and a base station. As another example, a reference signal may be transmitted and received between two different base stations. The reference signal may be used for various purposes. For example, the UE or the base station may perform synchronization or may estimate a position of the UE using the reference signal. As one of positioning methods using RAT, the UE may estimate a position of the UE by measuring a difference in time of arrival (ToA) between positioning reference signals (PRSs) received from a plurality of base stations.

Among positions of the UE, it is difficult to improve an estimation accuracy of a position of the UE in a vertical direction, that is, a vertical position of the UE. To classify a position of the UE based on a floor unit indoors, a positioning error in the vertical direction needs to be 3 meter or less. However, current positioning technologies do not meet the aforementioned positioning error in the vertical direction. A technique for increasing positioning accuracy of a UE includes a method of measuring a phase of a reference signal. However, a conventional phase measurement method may not readily determine an integer ambiguity.

SUMMARY

At least one example embodiment provides a positioning method and apparatus that may improve a positioning performance of a user equipment (UE) in a vertical direction.

According to an aspect, there is provided a positioning method performed by a user equipment, the positioning method including receiving reference signals from at least three transmitters; calculating a first phase difference between reference signals received from transmitters that belong to a first transmitter pair; calculating a second phase difference between reference signals received from transmitters that belong to a second transmitter pair; calculating a first position coordinate based on a first conversion coefficient set and the first phase difference; determining an integer ambiguity of the second phase difference based on a second conversion coefficient set, the second phase difference, and the first position coordinate; and determining a position of the user equipment based on the integer ambiguity of the second phase difference.

A distance between the transmitters that belong to the first transmitter pair may be less than a distance between the transmitters that belong to the second transmitter pair.

The determining the integer ambiguity of the second phase difference may include calculating second position coordinates based on the second conversion coefficient set and second phase differences corrected using a plurality of candidates of integer ambiguity; calculating a difference between each of the second position coordinates and the first position coordinate; and determining a candidate of integer ambiguity that minimizes a difference with the first position coordinate as the integer ambiguity of the second phase difference.

The first conversion coefficient set and the second conversion coefficient set may be determined from conversion coefficient set information that is pre-stored to correspond to a plurality of reference points.

The first conversion coefficient set and the second conversion coefficient set may be determined from conversion coefficient set information corresponding to at least one reference point adjacent to a horizontal coordinate of the user equipment among the plurality of reference points.

A waveform of each of the reference signals received from the at least three transmitters may continue in at least one symbol boundary.

Each of the reference signals received from the at least three transmitters may include a subcarrier group that includes subcarriers provided at equal intervals in a frequency domain.

The calculating the first phase difference between the reference signals received from the transmitters that belong to the first transmitter pair may include acquiring first sample data based on received data of a first reference signal received from a first transmitter that belongs to the first transmitter pair and acquiring second sample data based on received data of a second reference signal received from a second transmitter that belongs to the first transmitter pair; calculating a first phase vector and a second phase vector by performing an inner product of a discrete Fourier transform (DFT) coefficient vector for each of the first sample vector and the second sample vector; and calculating the first phase difference based on the first phase vector and the second phase vector.

The first phase difference may be calculated based on a conjugate product of the first phase vector and the second phase vector.

A change rate of the first phase difference according to an altitude of the user equipment may be less than that of the second phase difference according to the altitude of the user equipment.

According to another aspect, there is provided an apparatus including a communicator; and a processor configured to perform a process of receiving reference signals from at least three transmitters, a process of calculating a first phase difference between reference signals received from transmitters that belong to a first transmitter pair, a process of calculating a second phase difference between reference signals received from transmitters that belong to a second transmitter pair, a process of calculating a first position coordinate based on a first conversion coefficient set and the first phase difference, a process of determining an integer ambiguity of the second phase difference based on a second conversion coefficient set, the second phase difference, and the first position coordinate, and a process of determining a position of the user equipment based on the integer ambiguity of the second phase difference.

According to at least one example embodiment, it is possible to estimate a vertical position of a UE, that is, a position of the UE in a vertical direction based on a difference between reception delay times of reference signals transmitted at different heights.

According to at least one example embodiment, a UE may easily calculate a phase difference between reference signals by acquiring a sample vector and by acquiring a phase vector from the sample vector.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

DETAILED DESCRIPTION

Figure 1:
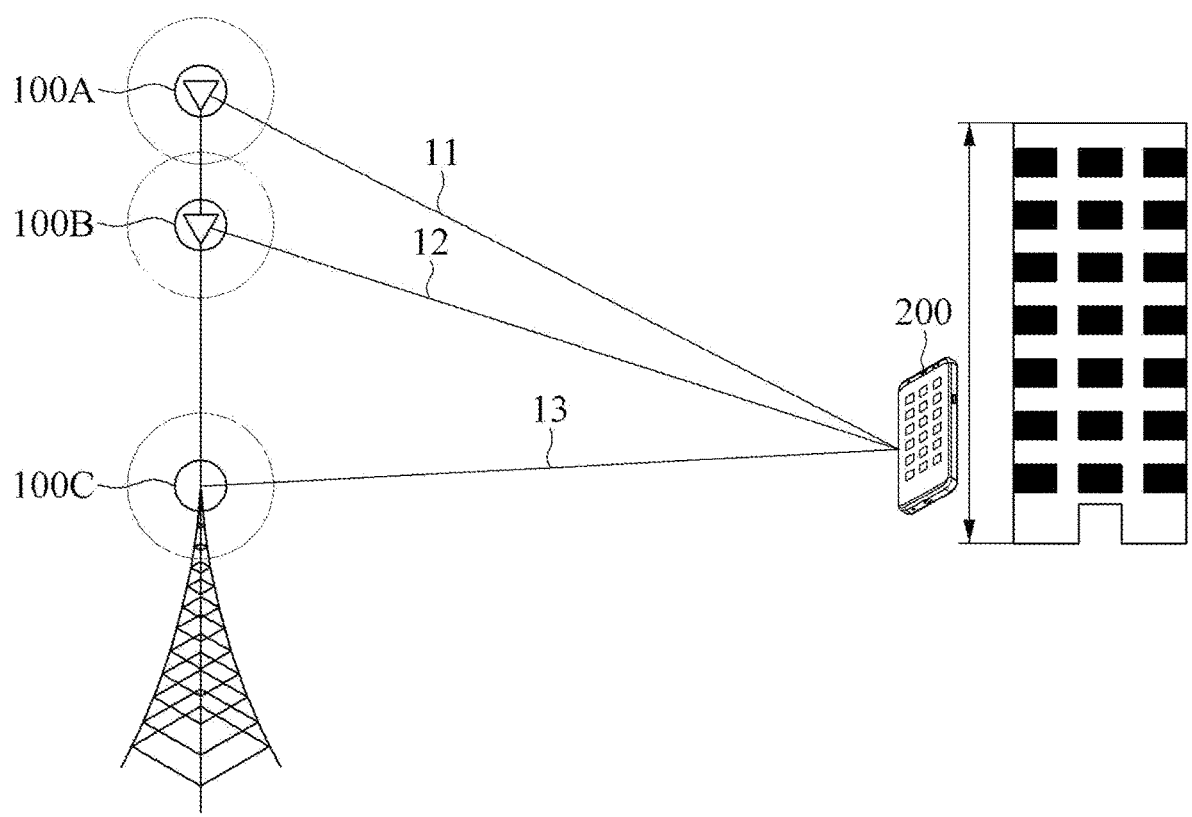
FIG. 1 illustrates an example of a communication system according to at least one example embodiment.

Various modifications and changes may be made to the present disclosure and the disclosure may include various example embodiments. Specific example embodiments are described in detail with reference to the accompanying drawings. The example embodiments, however, may be embodied in various different forms, and should not be construed as being limited to only the specific example embodiments. Rather, the example embodiments should be understood to include all of the modifications, equivalents, and substitutions included in the spirit and technical scope of the disclosure.

Although the terms "first," "second," etc., may be used herein to describe various components, the components should not be limited by these terms. These terms are only used to distinguish one component from another component. For example, a first component may also be termed a second component and, likewise, a second component may be termed a first component, without departing from the scope of this disclosure. As used herein, the term "and/or" includes any and all combinations of one or more of the associated items.

When a component is referred to as being "connected to" or "accessed to" another component, the component may be directly connected to or accessed to the other component, or one or more other intervening components may be present. In contrast, when a component is referred to as being "directly connected to" or "directly accessed to," there is no intervening component.

The terms used herein are used to simply explain specific example embodiments and are not construed to limit the present disclosure. The singular forms "a," "an," and "the," are intended to include the plural forms as well, unless the context clearly indicates otherwise. It will be further understood that the terms "comprises/comprising (incudes/including)," and "has/having" when used in this specification, specify the presence of stated features, integers, steps, operations, elements, and/or components, but do not preclude the presence or addition of one or more other features, integers, steps, operations, elements, components, and/or groups, thereof.

Unless otherwise defined, all terms including technical and scientific terms used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Hereinafter, example embodiments will be described in detail with reference to the accompanying drawings. For simplicity of description and general understanding of the disclosure, like reference numerals refer to like components throughout the present specification although they are illustrated in different drawings.

Herein, a reference signal may include, for example, a signal for positioning of a user equipment (UE), a signal for synchronization of the UE or a base station, and the like. However, it is provided as an example only. A method of estimating a reception delay time of a reference signal disclosed herein may apply to estimating a reception delay time of another signal aside from the reference signal. Here, although an example embodiment is described based on an example of estimating the reception delay time of the reference signal for clarity of description, it is provided as an example only. It should be understood that a method of estimating the reception delay time of the other signal aside from the reference signal is included in the example embodiment. Herein, although description is mainly made based on a method of measuring a position of a UE in a vertical direction that is, a vertical position of the UE, it is provided as an example only. For example, although the following description is mainly made based on a case in which transmitters are spaced apart in a vertical direction, the example embodiments may also apply to measure a position of the UE in a horizontal direction, that is, a horizontal position of the UE even in a case in which the transmitters are spaced apart from each other in the horizontal direction.

FIG. 1 illustrates an example of a communication system according to at least one example embodiment.

Referring to FIG. 1, the communication system may include a first transmitter 100A, a second transmitter 100B, and a third transmitter 100C installed at different heights. The first transmitter 100A may transmit a first reference signal 11 to a user equipment (UE) 200, the second transmitter 100B may transmit a second reference signal 12 to the UE 200, and the third transmitter 100C may transmit a third reference signal 13 to the UE 200. The first transmitter 100A, the second transmitter 100B, and the third transmitter 100C may be installed at different heights, respectively, in the same base station. As another example, at least two of the first transmitter 100A, the second transmitter 100B, and the third transmitter 100C may be installed at different heights in different base stations, respectively. As another example, the first transmitter 100A, the second transmitter 100B, and the third transmitter 100C may be installed at different heights in one or more buildings.

Transmitters may be classified into at least two transmitter pairs. For example, a first transmitter pair may include the first transmitter 100A and the second transmitter 100B. The second transmitter pair may include the first transmitter 100A and the third transmitter 100B. However, example embodiments are not limited thereto. For example, at least two of three transmitters may be included in the first transmitter pair or the second transmitter pair.

A distance between transmitters included in the second transmitter pair may be greater than a distance between transmitters included in the first transmitter pair. For example, a distance between the first transmitter 100A and the third transmitter 100C that belong to the second transmitter pair may be greater than a distance between the first transmitter 100A and the second transmitter 100B that belong to the first transmitter pair.

Figure 2:
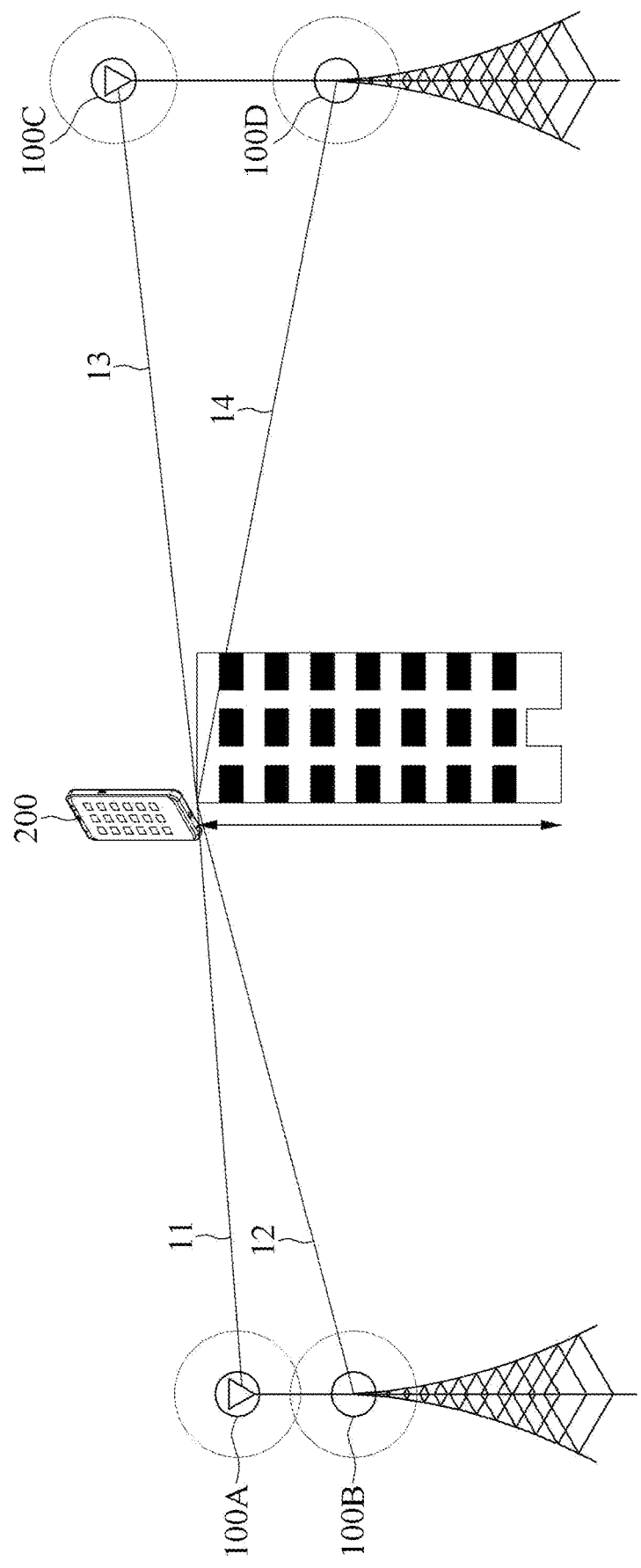
FIG. 2 illustrates another example of a communication system according to at least one example embodiment.

FIG. 2 illustrates another example of a communication system according to an example embodiment.

Referring to FIG. 2, the communication system may include at least four transmitters, for example, the first transmitter 100A, the second transmitter 100B, the third transmitter 100C, and a fourth transmitter 100D. The first transmitter 100A may transmit the first reference signal 11 to the UE 200, the second transmitter 100B may transmit the second reference signal 12 to the UE 200, the third transmitter 100C may transmit the third reference signal 13 to the UE 200, and the fourth transmitter 100D may transmit a fourth reference signal 14 to the UE 200. Although FIG. 2 illustrates an example in which the first transmitter 100A and the second transmitter 100B are installed in a first base station and the third transmitter 100C and the fourth transmitter 100D are installed in a second base station, it is provided as an example only and the example embodiments are not limited thereto. For example, three transmitters may be installed in a single base station and a remaining single transmitter may be installed in another base station. As another example, four transmitters may be installed in the same base station.

The transmitters may be classified into at least two transmitter pairs. For example, the first transmitter 100A and the second transmitter 100B may be included in a first transmitter pair. The third transmitter 100C and the third transmitter 100D may be included in a second transmitter pair. However, it is provided as an example only. For example, arbitrary two transmitters among four transmitters may be included in the first transmitter pair or the second transmitter pair.

A distance between transmitters included in the second transmitter pair may be greater than a distance between transmitters included in the first transmitter pair. For example, a distance between the third transmitter 100C and the fourth transmitter 100D that belong to the second transmitter pair may be greater than a distance between the first transmitter 100A and the second transmitter 100B that belong to the first transmitter pair.

Here, each of the first transmitter 100A, the second transmitter 100B, the third transmitter 100C, and the fourth transmitter 100D may be referred to as, for example, NodeB, next generation NodeB, evolved NodeB, a base transceiver station (BTS), a radio base station, a radio transceiver, an access point, an access node, a road side unit (RSU), a radio remote head (RRH), a transmission point (TP), a transmission and reception point (TRP), a relay node, and the like. The UE 200 may be referred to as a terminal, an access terminal, a mobile terminal, a station, a subscriber station, a mobile station, a portable subscriber station, a node, a device, and the like.

Figure 3:
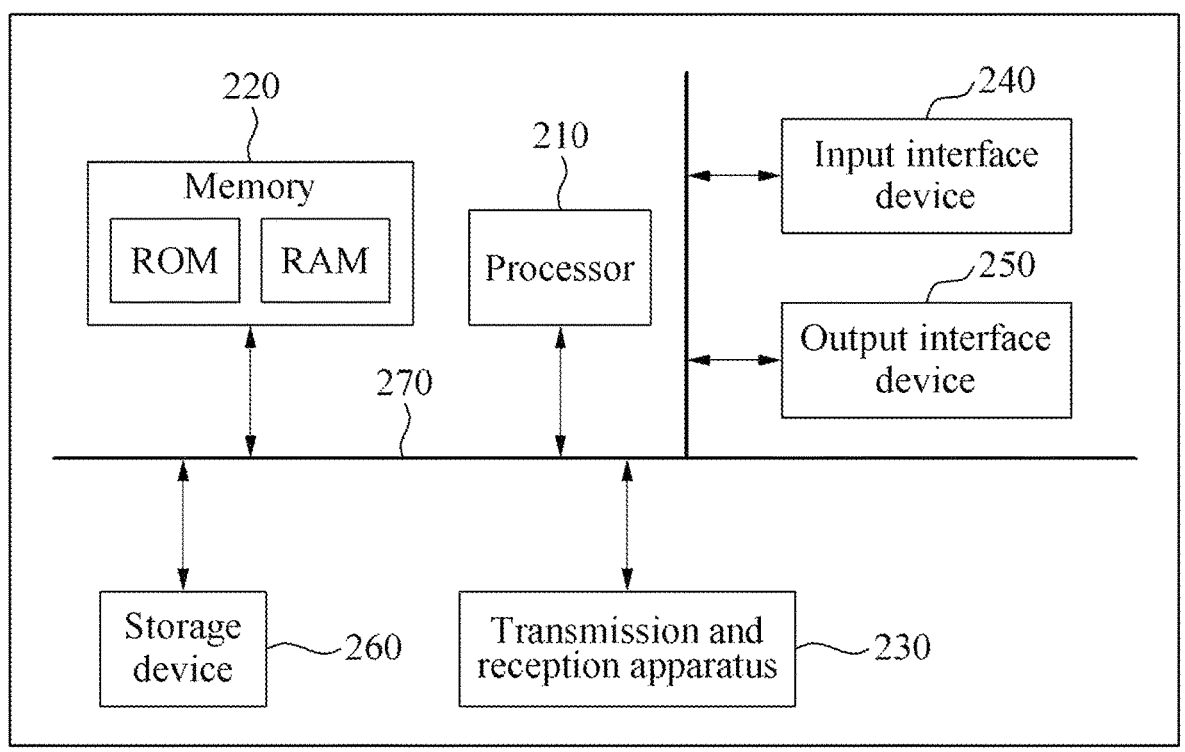
FIG. 3 is a diagram illustrating an example of a configuration of a communication node included in a communication system according to at least one example embodiment.

FIG. 3 is a diagram illustrating an example of a configuration of a communication node included in a communication system according to at least one example embodiment. Each of the first transmitter 100A, the second transmitter 100B, the third transmitter 100C, and the fourth transmitter 100D and the UE 200 of FIGS. 1 and 2 may be referred to as a communication node.

Referring to FIG. 3, a communication node may include at least one processor 210, a memory 220, and a transmission and reception apparatus 230 configured to perform communication through connection to a network. Also, the communication node may further include an input interface device 240, an output interface device 250, and a storage device 260. The components included in the communication node may communicate with each other through connection to a bus 270.

The processor 210 may execute a program command stored in at least one of the memory 220 and the storage device 260. The processor 210 may refer to a central processing unit (CPU), a graphics processing unit (GPU), or an exclusive processor that performs methods according to example embodiments. Each of the memory 220 and the storage device 260 may be configured as at least one of a volatile storage medium and a nonvolatile storage medium. For example, the memory 220 may be configured as at least one of read only memory (ROM) and random access memory (RAM).

Figure 4:
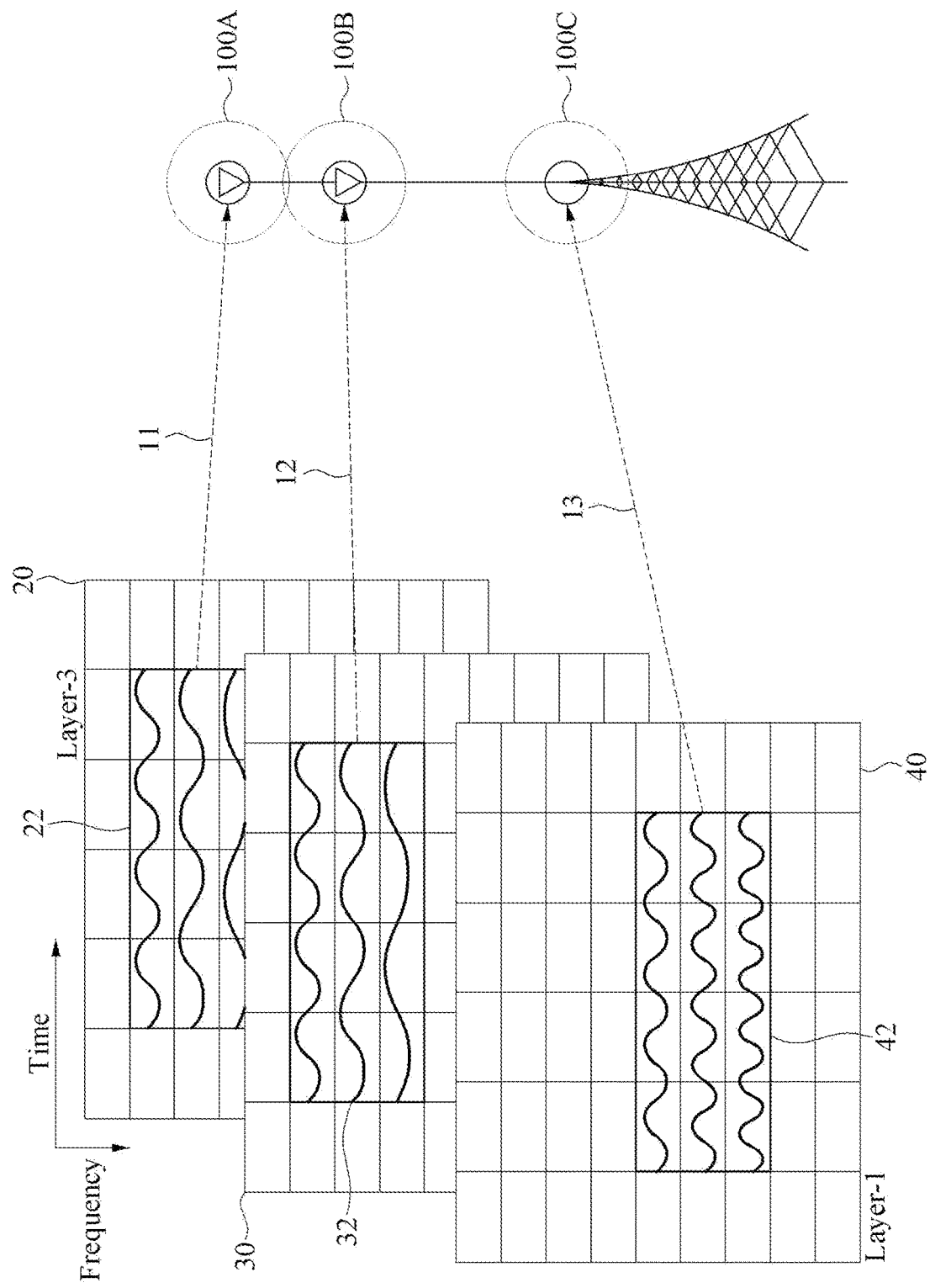
FIG. 4 illustrates an example of a process of transmitting, by first to third transmitters of FIG. 1, first to third reference signals, respectively, according to at least one example embodiment.

FIG. 4 illustrates an example of a process of transmitting, by the first to the third transmitters 100A, 100B, and 100C, the first to the third reference signals 11, 12, and 13, respectively, according to at least one example embodiment.

Referring to FIG. 4, the first transmitter 100A may set a first subcarrier group 22 for transmitting the first reference signal 11, the second transmitter 100B may set a second subcarrier group 32 for transmitting the second reference signal 12, and the third transmitter 100C may set a third subcarrier group 42 for transmitting the third reference signal 13.

The first subcarrier group 22, the second subcarrier group 32, and the third subcarrier group 42 may be orthogonally provided in different regions in a frequency domain. As another example, at least two of the first subcarrier group 22, the second subcarrier group 32, and the third subcarrier group 42 may be present in the same region in the frequency domain. In this case, at least two of the first reference signal 11, the second reference signal 12, and the third reference signal 13 may be orthogonally provided in different regions.

The first transmitter 100A may transmit the first reference signal 11 in a waveform continuous in a boundary between symbols using the first subcarrier group 22. The second transmitter 100B may transmit the second reference signal 12 in a waveform continuous in a boundary between symbols using the second subcarrier group 32. The third transmitter 100C may transmit the third reference signal 13 in a waveform continuous in a boundary between symbols using the third subcarrier group 42. Each of the first reference signal 11, the second reference signal 12, and the third reference signal 13 may be transmitted through a plurality of consecutive symbols. Since each of the first reference signal 11, the second reference signal 12, and the third reference signal 13 has the waveform continuous in the boundary between symbols, a UE receiving the first reference signal 11, the second reference signal 12, and the third reference signal 13 may readily acquire a plurality of snapshot vectors by changing a sample collection time in a random time interval.

Subcarriers that constitute each subcarrier group may be provided at equal intervals in the frequency domain. FIG. 4 illustrates an example in which an interval between subcarriers in each of the first subcarrier group 22, the second subcarrier group 32, and the third subcarrier group 42 is 1. However, it is provided as an example only. For example, the subcarriers may be provided at intervals greater than 1. Also, the interval between the subcarriers may vary depending on a subcarrier group.

The first transmitter 100A may transmit the first reference signal 11 using a first resource block 20, the second transmitter 100B may transmit the second reference signal 12 using a second resource block 30, and the third transmitter 100C may transmit the third reference signal 13 using a third resource block 40. Each of the first resource block 20, the second resource block 20, and the third resource block 40 may be differently set. For example, a layer of the first resource block 20 may be set to differ from those of the second resource block 30 and the third resource block 40. Therefore, an antenna port through which the first reference signal 11 is transmitted may be set to differ from an antenna port through which the second reference signal 12 or the third reference signal 13 is transmitted.

The UE 200 may independently estimate each of a delay time of the first reference signal 11, a delay time of the second reference signal 12, and a delay time of the third reference signal 13 based on an aspect that the first reference signal 11, the second reference signal 12, and the third reference signal 13 are orthogonal to each other in the frequency domain or a time domain.

Referring to FIG. 4 each of the first reference signal 11, the second reference signal 12, and the third reference signal 13 may have a waveform continuous in a boundary of at least one symbol. Hereinafter, a sequence of a reference signal such that a waveform of the reference signal may be continuous in a boundary between symbols is described.

Figure 5:
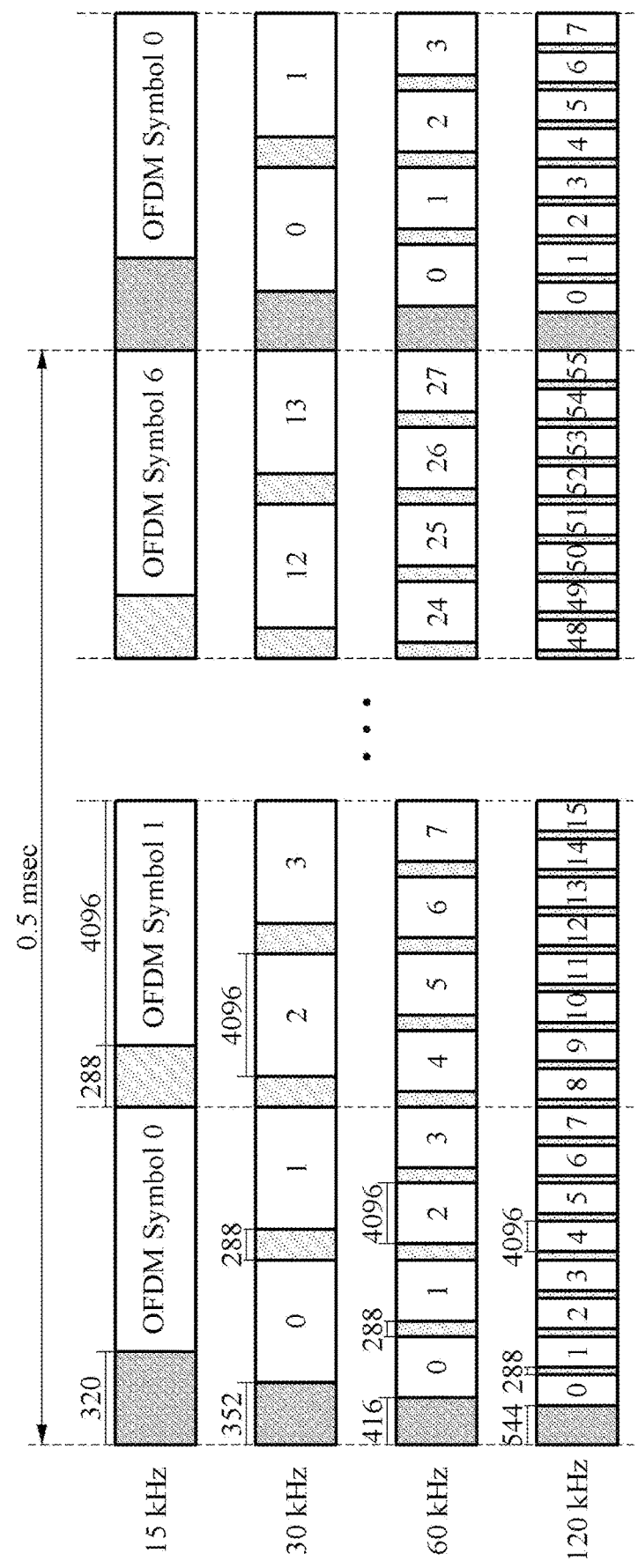
FIG. 5 illustrates an example of a structure of an orthogonal frequency division multiplexing (OFDM) symbol in a 5-th generation new radio (NR) standard according to at least one example embodiment.

FIG. 5 illustrates an example of a structure of an orthogonal frequency division multiplexing (OFDM) symbol in a 5G new radio (NR) standard according to at least one example embodiment.

Referring to FIG. 5, in the 5G NR standard, $(7 \times 2^\mu)$ OFDM symbols may be included in 0.5 ms. That is, if a subcarrier spacing is 15 kHz, 7 OFDM symbols may be included in 0.5 ms, if the subcarrier spacing is 30 kHz, 14 OFDM symbols may be included in 0.5 ms, if the subcarrier spacing is 60 kHz, 28 OFDM symbols may be included in 0.5 ms, if the subcarrier spacing is 120 kHz, 56 OFDM symbols may be included in 0.5 ms, if the subcarrier spacing is 240 kHz, 112 OFDM symbols may be included in 0.5 ms, and if the subcarrier spacing is 480 kHz, 224 OFDM symbols may be included in 0.5 ms. Here, if the subcarrier spacing is 60 kHz and an extended cyclic prefix (CP) is used, 24 OFDM symbols may be included in 0.5 ms.

To meet a condition that a sum of lengths of $7 \times 2^\mu$ OFDM symbols is 0.5 ms, a length of CP included in a first OFDM symbol in 0.5 ms duration may be greater than a length of CP included in a remaining symbol. The length of CP included in the remaining symbol excluding the first symbol in the 0.5 ms duration may be $144 T_s \times 2^{-\mu}$. Also, the length of CP of the first symbol in the 0.5 ms duration may be $144 T_s \times 2^{-\mu} + 16 T_s$.

In the 5G NR standard, a length of a valid period of a symbol may be represented as a basic time unit $T_s$ according to Equation 1.

$$N_u^\mu = 2048 T_s \cdot 2^{-\mu} \qquad \text{[Equation 1]}$$

In Equation 1, μ denotes a parameter (i.e., NR numerology number) that determines the subcarrier spacing and $N_u^\mu$ denotes the length of the valid period of the symbol that is represented as the basic time unit.

In the 5G NR standard, the CP length may be represented as the basic time unit $T_s$ according to Equation 2.

$$N_{CP,\ell}^\mu = \begin{cases} 512\, T_s \cdot 2^{-\mu} & \text{extended cyclic prefix} \\ 144\, T_s \cdot 2^{-\mu} + 16\, \ell = 0 \text{ or } \ell = 7 \cdot 2^\mu \\ 144\, T_s \cdot 2^{-\mu}\, \ell \neq 0 \text{ and } \ell \neq 7 \cdot 2^\mu \end{cases} \qquad \text{[Equation 2]}$$

In Equation 2, for simplicity, it is assumed that an index of a symbol is numbered for each subframe. In this case, in a single subframe, a symbol with an index of $\ell = 0$ and a symbol with an index of $\ell = 7 \cdot 2^\mu$ may correspond to first symbols in 0.5 ms duration. In contrast, an index of a remaining symbol excluding the first symbol in the 0.5 ms duration may satisfy $\ell \neq 0$ and $\ell \neq 7 \cdot 2^\mu$. In each case, the CP length may be determined according to Equation 2.

A UE may estimate a reception delay time of a reference signal by applying a super resolution analysis algorithm. To apply the super resolution analysis algorithm, a large number of snapshot vectors may be required. The UE may set a plurality of summation time intervals within a time interval in which the reference signal is received to acquire a snapshot vector. The UE may extract snapshot vectors in different summation time intervals by moving, i.e., shifting a start point of a summation time interval. Here, if the reference signal is discontinuous in a boundary between symbols, a summation time interval may be limited to be present in a single symbol. Accordingly, it may be difficult for the UE to acquire a sufficient number of snapshot vectors in a time interval in which the reference signal is received.

In general, an OFDM transmission method is used to describe that a reference signal is discontinuous in a boundary between symbols.

In a plurality of OFDM symbols, the respective subcarrier components may be orthogonal to each other. In an OFDM symbol, a signal may be represented as a sum of N complex sine waves. Therefore, a random signal may be represented as Equation 3.

$$x_\ell[n] = \sum_{k=0}^{N-1} X_\ell[k] e^{j2\pi kn/N}, n = 0, 1, 2, 3, \ldots N-1 \quad \text{[Equation 3]}$$

In Equation 3, N denotes a total number of subcarriers and $X\ell$ [k] denotes a frequency domain complex exponentiation representing an initial phase and amplitude of a $k^{th}$ subcarrier of an $\ell$-th symbol.

Figure 6:
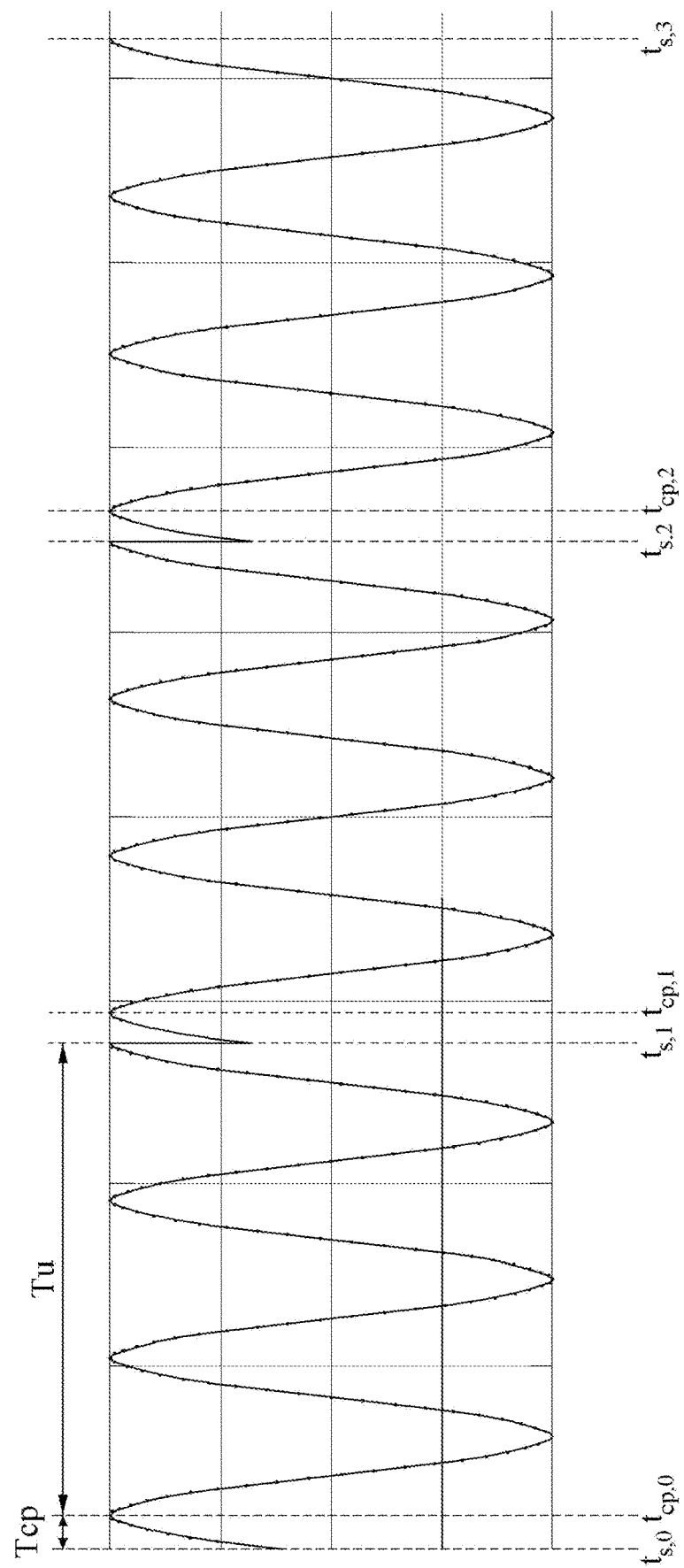
FIG. 6 illustrates an example of a subcarrier, for example, corresponding to k=3, discontinuous in a boundary between OFDM symbols according to at least one example embodiment.

FIG. 6 illustrates an example of a subcarrier discontinuous in a boundary between OFDM symbols according to at least one example embodiment. In FIG. 6, a subcarrier corresponds to, for example, k=3.

Referring to FIG. 6, $t_{s,0}$, $t_{s,1}$, $t_{s,2}$, and $t_{s,3}$ denote a start point of a zero-th symbol, a start point of a first symbol, a start point of a second symbol, and a start point of a third symbol, respectively. Also, $t_{cp,0}$ denotes an end point of a CP duration of the zero-th symbol and also a start point of a valid period of the zero-th symbol.

Likewise, $t_{cp,1}$ and $t_{cp,2}$ denote an end point of a CP duration of the first symbol and an end point of a CP duration of the second symbol, respectively. $T_u$ denotes a length of a valid period of a symbol and $T_{CP}$ denotes a length of a CP duration of the symbol.

During the valid period of the symbol ($T_u$), a phase of a sine wave may rotate by an integer multiple of $2\pi$ (e.g., if k=3, $2\pi \times 3 = 6\pi$). Accordingly, a signal phase $\varphi_0$ at $t_{cp,0}$ that is the start point of the valid period of the zero-th symbol may be equal to a signal phase at $t_{s,1}^-$ that is the end point of the zero-th symbol. Here, $t_{s,1}^-$ may indicate a left limit of $t_{s,1}$, and $t_{s,1}^+$ may indicate a right limit of $t_{s,1}$. Referring to FIG. 6, a signal phase at $t_{s,1}^-$ may differ from a signal phase at $t_{s,1}^+$. While the signal phase at $t_{s,1}^-$ may be $\varphi_0$, the signal phase at $t_{s,1}^+$ may be $$\varphi_0 - 2\pi k \cdot \frac{T_{CP}}{T_u}.$$

That is, the signal may be discontinuous at $t_{s,1}$.

If a normal CP is applied in a 4G or 5G system, $T_{cp}/T_u = 9/128$. Also, if an extended CP is applied in the 4G or 5G system, $T_{cp}/T_u = 1/4$.

A transmitter may change a signal phase at $t_{cp,1}$ to differ from a signal phase at $t_{cp,0}$ such that a signal phase at $t_{s,1}^-$ may be equal to a signal phase at $t_{s,1}^+$. For example, if the signal phase at $t_{cp,1}$ is set to $$\varphi_0 + 2\pi k \cdot \frac{T_{CP}}{T_u},$$

the signal phase at $t_{s,1}^-$ may become equal to the signal phase at $t_{s,1}^+$. That is, the signal may be continuous at $t_{s,1}$. Generally describing, the transmitter may set a sequence of a reference signal such that a phase of a sequence of an $n^{th}$ symbol may be shifted by a phase corresponding to a CP duration of an (n−1)-th symbol compared to a phase of a sequence of the (n−1)-th symbol. Here, n denotes a natural number. In an LTE standard, n=1, 2, . . . 6. In a 5G NR standard, n denotes a random natural number.

For example, the transmitter may determine a sequence of a reference signal to satisfy Equation 4.

$$X_\ell[k] = X_{\ell-1}[k] \cdot \exp\left(2\pi jk \cdot \frac{T_{CP,\ell-1}}{T_u}\right) \quad \text{[Equation 4]}$$

In Equation 4, $X_\ell$ [k] denotes a frequency domain complex exponentiation representing an initial phase and amplitude of a $k^{th}$ subcarrier of an $\ell$-th symbol, $T_u$ denotes a length of a valid period of a symbol, and $T_{CP,\ell-1}$ denotes a length of a CP duration of an ($\ell-1$)-th symbol. Here, $\ell$ denotes a natural number. In the LTE standard, an index of a symbol may be counted for each slot. If a normal CP is used in the LTE standard, $\ell = 1, 2, \ldots 6$. If an extended CP is used in the LTE standard, $\ell = 1, 2, \ldots 5$. In the 5G NR standard, an index of a symbol may continuously increase in a time domain. Accordingly, in the 5G NR standard, $\ell$ may be a random natural number.

Referring to Equation 4, in a sequence of a reference signal, a sequence value corresponding to the $\ell$-th symbol may correspond to a value that is phase-shifted by $$2\pi k \cdot \frac{T_{CP,\ell-1}}{T_u}$$

from a sequence value corresponding to the ($\ell-1$)-th symbol. Differently representing Equation 4, it may be expressed as Equation 5.

$$X_\ell[k] = X_0[k] \cdot \exp\left(2\pi jk \cdot \sum_{i=1}^{l} \frac{T_{CP,i-1}}{T_u}\right) \quad \text{[Equation 5]}$$

In Equation 5, $X_0$ [k] denotes a frequency domain complex exponentiation representing an initial phase and amplitude of a $k^{th}$ subcarrier of an initial symbol (symbol index=0).

In the LTE standard, a sequence component of a symbol not present at a start point of a slot may be phase-shifted from a sequence component of a previous symbol by $$2\pi k \times \frac{9}{128}.$$

If the normal CP is applied in the LTE standard, a sequence of a reference signal may be represented as Equation 6.

$$X_{s,\ell}[k] = (-1)^{s \cdot k} \varphi_{init}^k \cdot \exp\left(2\pi jk \cdot \ell \cdot \frac{T_{cp}}{T_u}\right) \quad \text{[Equation 6]}$$

In Equation 6, $\varphi_{init}^k$ denotes a frequency domain complex exponentiation representing an initial phase and amplitude of a $k^{th}$ subcarrier of an initial symbol of an initial slot. Also, s denotes a slot index, $\ell$ denotes a symbol index, and $X_{s,\ell}$[k] denotes a frequency domain complex exponentiation representing an initial phase and amplitude of a $k^{th}$ subcarrier of an $\ell$-th symbol of an $s^{th}$ slot. If k is an even number, $(-1)^{s \cdot k}$ is 1 at all times. Therefore, an initial phase of a $k^{th}$ subcarrier of a start symbol of a slot may be the same regardless of a slot index. In contrast, if k is an odd number, $(-1)^{s,k}$ is $-1$ for s=odd number and 1 for s=even number. Therefore, the initial phase of the $k^{th}$ subcarrier of the start symbol of the slot may vary based on a slot index. If the symbol index $\ell$ is numbered for each slot, $\ell$ may be one of 0, 1, 2, . . . 6. Accordingly, P=$\ell$ and $$\frac{T_{cp}}{T_u} 9/128.$$

If the normal CP is applied in the 5G NR standard, a sequence of a reference signal may be represented as Equation 7.

$$X_{s,\ell}[k] = (-1)^{s \cdot k \cdot \delta(\mu)} \varphi_{init}^k \cdot \exp\left(2\pi jk \cdot P \cdot \frac{T_{cp}}{T_u}\right), \quad \text{[Equation 7]}$$
$$P = \ell \bmod (7 \cdot 2^\mu), \mu = 0, 1, 2, 3..$$

In Equation 7, $\varphi_{init}^k$ denotes a frequency domain complex exponentiation representing an initial phase and amplitude of a $k^{th}$ subcarrier of an initial symbol of an initial slot, and $X_{s,\ell}[k]$ denotes a frequency domain complex exponentiation representing an initial phase and amplitude of a $k^{th}$ subcarrier of an $\ell$-th symbol of an $s^{th}$ slot. Also, mod denotes a modulo function used to acquire a remainder. In the case of the normal CP of the LTE standard, numerology number $\mu=0$ and accordingly, P and $\ell=0$, . . . 6. Also, $\delta(\mu)$ is a Dirac delta function that is defined as 1 only if $\mu=0$. An index portion equation of $-1$ that determines a sign of a subcarrier, i.e., $s \cdot k \cdot \delta(\mu)$, is defined if $\mu=0$, that is, if a subcarrier spacing is 15 kHz. The index portion of $-1$ is 0 in other subcarrier spacings, that is, if $\mu>0$. Therefore, start symbols of all of the subcarriers have a positive sign. If $\mu=0$ and s*k=odd number, $s \cdot k \cdot \delta(\mu)$ that is the index portion equation of $-1$ becomes an odd number and a start sign of a subcarrier becomes $-1$. That is, in the LTE standard or the 5G NR standard to which the subcarrier spacing of 15 kHz is applied, if k is an odd numbered subcarrier, a first symbol sign of each slot is $+1$ for slot number=even number and $-1$ for slot number=odd number. If the normal CP is applied, $$\frac{T_{cp}}{T_u} = 9/128.$$

In the 5G NR standard, if the symbol index is numbered based on a subframe unit and, in this instance, if subcarrier spacing=15 kHz, a sequence of a reference signal may be represented as Equation 8.

$$X_\ell[k] = (-1)^{s \cdot k} \varphi_{init}^k \cdot \exp\left(j\frac{9}{64}kP\pi\right) \quad \text{[Equation 8]}$$
$$s = \left[\frac{\ell}{7}\right],$$
$$P = \ell \bmod 7$$

In Equation 8, $\varphi_{init}^k$ denotes a frequency domain complex exponentiation representing an initial phase and amplitude of a $k^{th}$ subcarrier of an initial symbol of an initial slot, and $X_\ell[k]$ denotes a frequency domain complex exponentiation representing an initial phase and amplitude of a $k^{th}$ subcarrier of an $\ell$-th symbol. s denotes a maximum integer less than or equal to $$\frac{\ell}{7}.$$

Here, the parameter s is redefined since a length of a slot is not 0.5 msec if subcarrier spacing=15 kHz in the 5G NR standard. Here, P denotes a remainder acquired by dividing $\ell$ by 7. For example, if $\ell=10$, s=1 and P=3.

In the 5G NR standard, if the subcarrier spacing is 15 kHz or higher (e.g., 30 kHz, 60 kHz, 120 kHz, 240 kHz), there is no need to change a sign of a sequence component based on a unit of 0.5 msec. Also, referring again to Equation 2, a length of a start symbol ($\ell=0$ or $\ell=7 \cdot 2^\mu$) in 0.5 msec duration may differ from lengths of other symbols ($\ell \neq 0$ and $\ell \neq 7 \cdot 2^\mu$). With the assumption that the normal CP is applied, if the subcarrier spacing is 15 kHz or higher in the 5G NR standard, a sequence of a reference signal may be represented as Equation 9.

$$\begin{cases} X_\ell[k] = \varphi_{init}^k \ \ell = 0 \text{ or } \ell = 7 \cdot 2^\mu \\ X_\ell[k] = \phi_{init}^k \cdot \exp\left(j\frac{9}{64}k\ell\pi\right) \ell \neq 0 \text{ and } \ell \neq 7 \cdot 2^\mu \end{cases} \quad \text{[Equation 9]}$$

In Equation 9, $\mu$ denotes a parameter that determines a subcarrier spacing, $\varphi_{init}^k$ denotes a frequency domain complex exponentiation representing an initial phase and amplitude of a $k^{th}$ subcarrier of an initial symbol of an initial slot, and $X_\ell[k]$ denotes a frequency domain complex exponentiation representing an initial phase and amplitude of a $k^{th}$ subcarrier of an $\ell$-th symbol. Although numerology of the normal CP is applied in Equation 9, it is provided as an example only and the example embodiments are not limited thereto.

If the extended CP is applied in the LTE standard and the 5G NR standard, a sequence of a reference signal may be represented as Equation 10.

$$X_{s,\ell}[k] = (-1)^{s \cdot k} \varphi_{init}^k \cdot \exp\left(2\pi jk \cdot \ell \cdot \frac{T_{cp}}{T_u}\right), \text{ in } LTE \quad \text{[Equation 10]}$$

$$X_{s,\ell}[k] = \varphi_{init}^k \cdot \exp\left(2\pi jk \cdot \ell \cdot \frac{T_{cp}}{T_u}\right) \text{ in } 5GNR$$

In Equation 10, in the LTE standard, $\ell$ denotes a symbol index and may be 0 . . . 5. Also, in the 5G NR standard, $\ell$ denotes the symbol index and may be 0 . . . 11. Also, $\varphi_{init}^k$ denotes a frequency domain complex exponentiation representing an initial phase and amplitude of a $k^{th}$ subcarrier of an initial symbol of an initial slot, and $X_{s,\ell}[k]$ denotes a frequency domain complex exponentiation representing an initial phase and amplitude of a $k^{th}$ subcarrier of an $\ell$-th symbol of an $s^{th}$ slot. If k is an odd numbered subcarrier, a first symbol sign of each slot is $+1$ for slot number=even number and $-1$ for slot number=odd number. If k is an even numbered subcarrier, all of start number signs of each slot are +1. In the 5G NR standard, a single slot may include 12 symbols and an accumulated CP duration in the slot may be three times (¼*12=3) of a valid period of a symbol. Accordingly, since a phase shift amount by the accumulated extended CP duration in a slot is 6 πk, initial phases of $k^{th}$ subcarriers in start symbols of different slots may be equal to each other. In the extended CP, $T_{cp}/T_u = ¼$.

If the symbol index is numbered for each subframe and the extended CP is applied, a sequence of a reference signal may be represented as Equation 11.

$$X_\ell[k] = (-1)^{s \cdot k} \varphi_{init}^k \cdot \exp\left(2\pi j k \cdot P \cdot \frac{T_{cp}}{T_u}\right), \quad \text{[Equation 11]}$$

$$s = \left[\frac{\ell}{6}\right],$$

$P = \ell \mod 6$ in $LTE$ $$X_\ell[k] = \varphi_{init}^k \cdot \exp\left(2\pi j k \cdot P \cdot \frac{T_{cp}}{T_u}\right),$$

$P = \ell \mod 24$ in $5GNR$

In Equation 11, $\ell$ denotes a symbol index and may be 0 ... 5. $\varphi_{init}^k$ denotes a frequency domain complex exponentiation representing an initial phase and amplitude of a $k^{th}$ subcarrier of an initial symbol of an initial slot, and $X_\ell[k]$ denotes a frequency domain complex exponentiation representing an initial phase and amplitude of a $k^{th}$ subcarrier of an $\ell$-th symbol. If 60 kHz subcarrier spacing is applied, P may be 0 ... 23 in a symbol of the extended CP and $T_{cp}/T_u = ¼$.

Figure 7:
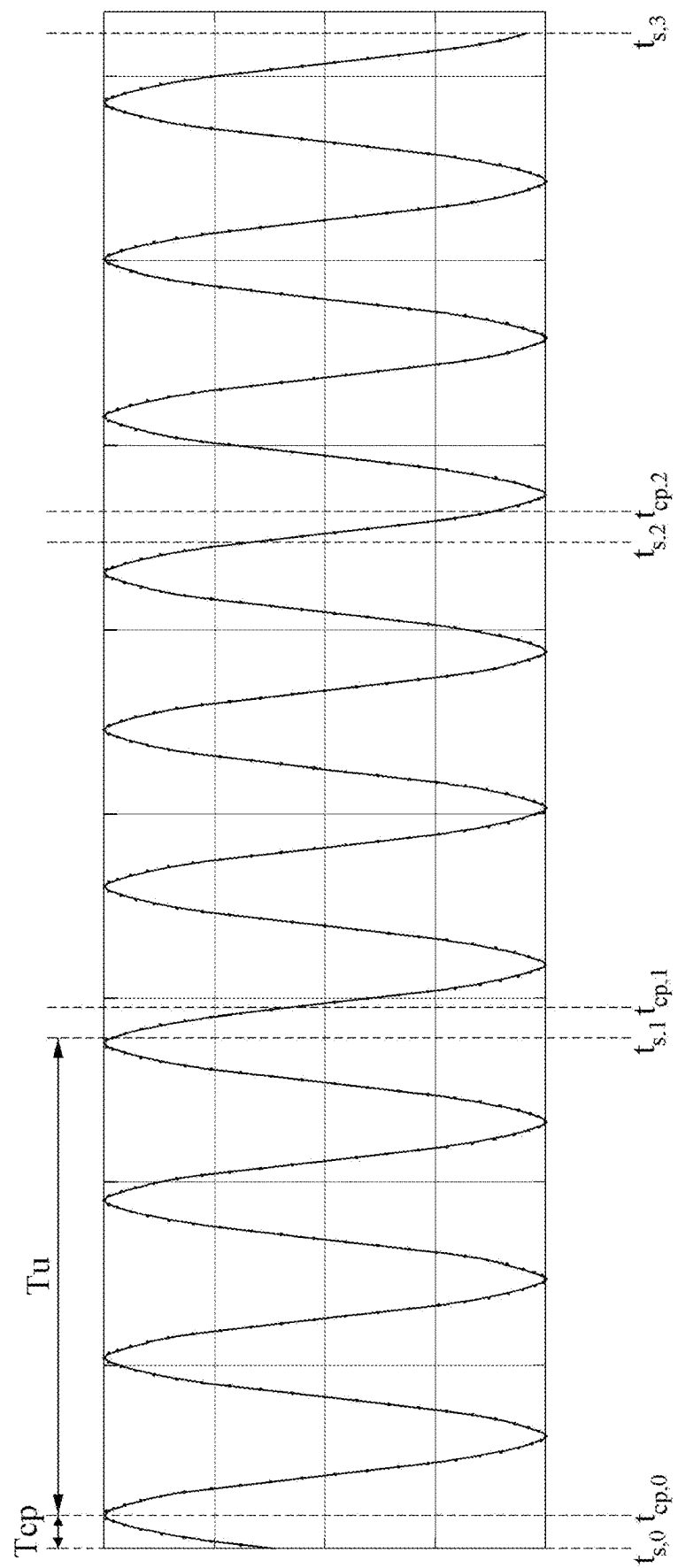
FIG. 7 illustrates an example of waveforms of first to third reference signals according to at least one example embodiment.

FIG. 7 illustrates an example of a waveform of each of a first reference signal, a second reference signal, and a third reference signal according to at least one example embodiment.

Referring to FIG. 7, at least one of the first transmitter 100A, the second transmitter 100B, and the third transmitter 100C may generate a reference signal based on a sequence of a reference signal that is determined according to one of Equation 4 to Equation 11. Accordingly, a waveform of the reference signal of FIG. 7 may be continuous in a boundary between adjacent symbols, which differs from the example of FIG. 6. If a UE performs a fast Fourier transform (FFT), there may be no need to include an FFT window in a single symbol. That is, the UE may move, that is, shift the FFT window without considering a boundary between symbols. The UE may change a start point of a summation time interval that is proportional to a size of the FFT window in a time interval in which the reference signal is received, without considering the boundary between symbols. Accordingly, the UE may acquire a sufficient number of snapshot vectors.

Figure 8:
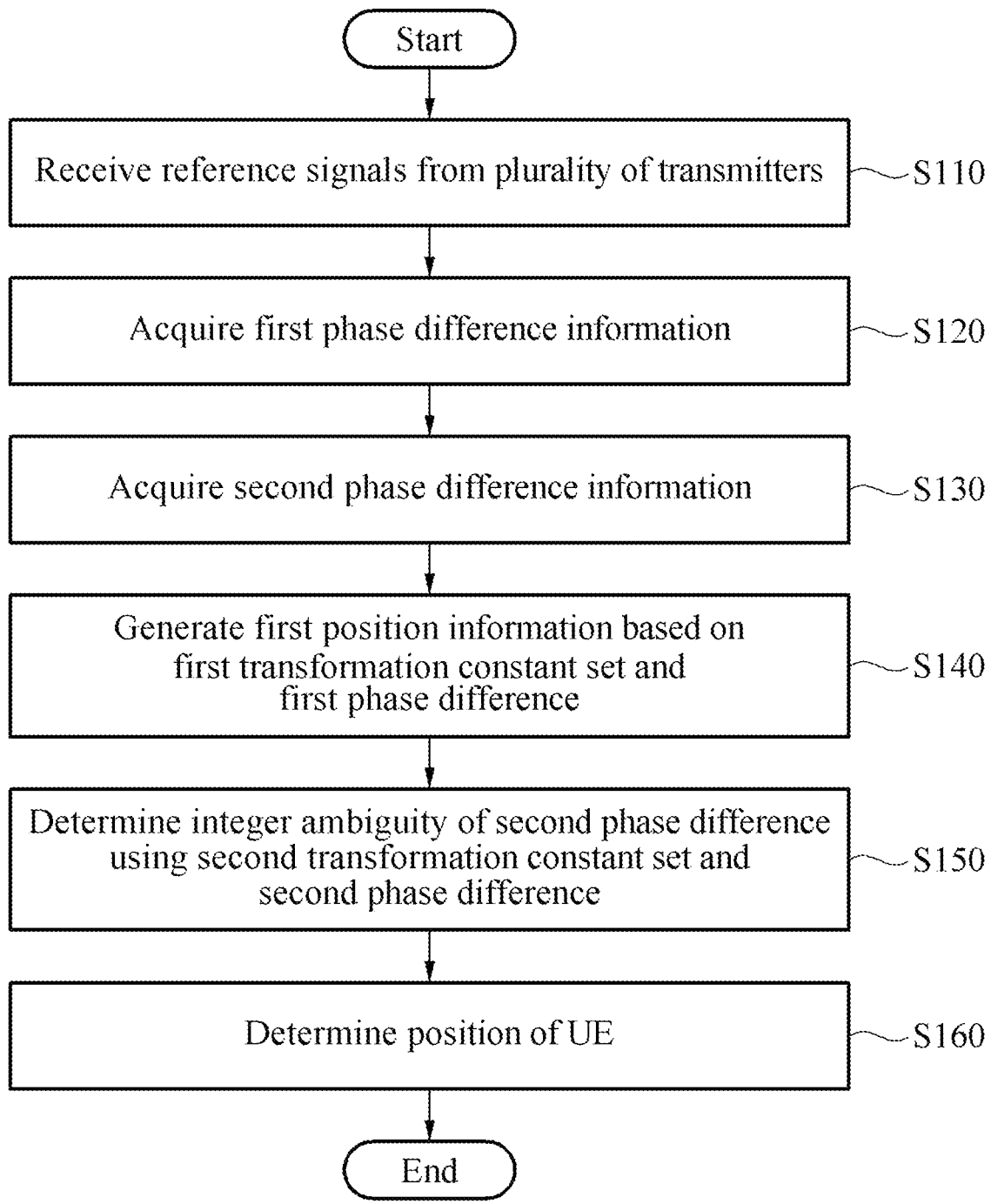
FIG. 8 is a flowchart illustrating an example of a positioning method of a user equipment (UE) according to at least one example embodiment.

FIG. 8 is a flowchart illustrating an example of a positioning method of a UE according to at least one example embodiment.

Referring to FIG. 8, in operation S110, the UE 200 may receive a plurality of reference signals. For example, the UE may receive a first reference signal from the first transmitter 100A, may receive a second reference signal from the second transmitter 100B, and may receive a third reference signal from the third transmitter 100C.

If at least four transmitters are present, the UE may receive at least four reference signals.

The UE 200 may acquire a plurality of snapshot vectors by shifting a start point of a summation time interval within a time interval in which a reference signal is received.

Each of the plurality of snapshot vectors may correspond to a different summation time interval. If a waveform of each of subcarrier signals included in the reference signal is continuous regardless of a boundary between symbols, the UE 200 may shift the start point of the summation time interval without considering the boundary between the symbols. For example, the UE 200 may shift the start point of the summation time interval based on a sample time unit that is determined based on a sampling rate. As another example, the UE 200 may shift the start point of the summation time interval based on a multiple unit of a sample time. The UE 200 may acquire a plurality of snapshot vectors by shifting the start point of the summation time interval based on the sample time unit within a single symbol. A length of the summation time interval may be less than a length of a time interval in which the UE 200 receives the reference signal.

The first reference signal transmitted from the first transmitter 100A may be represented as Equation 12.

$$S_a(t) = (A_1 e^{i\omega_{v+1}t} + A_2 e^{i\omega_{v+2}t} + \ldots + A_m e^{i\omega_{v+m}t}) \cdot e^{i\omega_c t} = \sum_{q=1}^m A_q e^{i(\omega_c + \omega_{v+q})t} \quad \text{[Equation 12]}$$

In Equation 12, $s_a(t)$ denotes the first reference signal modulated to a passband signal, $\omega_c$ denotes an angular frequency of a subcarrier, and a time t denotes a point in time included in a time interval in which the first reference signal is transmitted. For example, if a reference signal continues during n symbol periods, t may be one of values between 0 and $n \times (T_u + T_{CP})$.

Also, $A_q$ denotes a modulated strength component of a subcarrier signal having an angular frequency $\omega_{v+q}$. Here, v denotes an index smaller by 1 than an angular frequency index of a first subcarrier of a first subcarrier group.

Likewise, the second reference signal transmitted from the second transmitter 100B may be represented as Equation 12. In describing the following equations, description related to notations shown in previous equations is omitted.

$$S_b(t) = (B_1 e^{i\omega_{u+1}t} + B_2 e^{i\omega_{u+2}t} + \ldots + B_m e^{i\omega_{u+m}t}) \cdot e^{i\omega_c t} = \sum_{q=1}^m B_q e^{i(\omega_c + \omega_{u+q})t} \quad \text{[Equation 13]}$$

In Equation 13, $s_b(t)$ denotes the second reference signal modulated to a passband signal, and $B_q$ denotes a modulated strength component of a subcarrier signal having an angular frequency $\omega_{u+q}$. Here, u denotes an index smaller by 1 than an angular frequency index of a first subcarrier of a second subcarrier group.

The third reference signal transmitted from the third transmitter 100C may be represented as Equation 14.

$$S_c(t) = (C_1 e^{i\omega_{r+1}t} + C_2 e^{i\omega_{r+2}t} + \ldots + C_m e^{i\omega_{r+m}t}) \cdot e^{i\omega_c t} = \sum_{q=1}^m C_q e^{i(\omega_c + \omega_{r+q})t} \quad \text{[Equation 14]}$$

In Equation 14, $S_c(t)$ denotes the third reference signal modulated to a passband signal, and $C_q$ denotes a modulated strength component of a subcarrier signal having an angular frequency $\omega_{r+q}$. Here, r denotes an index smaller by 1 than an angular frequency index of a first subcarrier of a third subcarrier group.

When the first reference signal travels for a time $\tau_{a1}$ and arrives at the UE 200, the first reference signal received at the UE 200 may be represented as Equation 15.

$$S_a(t-\tau_{a1}) = \sum_{q=1}^m A_q e^{i(\omega_c + \omega_{v+q})(t-\tau_{a1})} = e^{i\omega_c(t-\tau_{a1})} \sum_{q=1}^m A_q e^{i\omega_{v+q}(t-\tau_{a1})} \quad \text{[Equation 15]}$$

When an arrival delay time of the second reference signal is represented as $\tau_{b1}$ and an arrival delay time of the third reference signal is represented as $\tau_{c1}$, the second reference signal received at the UE 200 may be represented as Equation 16 and the third reference signal received at the UE 200 may be represented as Equation 17.

$$S_b(t-\tau_{b1}) = \Sigma_{q=1}{}^m B_q e^{i(\omega_c + \omega_{u+q})(t-\tau_{b1})} = e^{i\omega_c(t-\tau_{b1})}$$
$$\Sigma_{q=1}{}^m B_q e^{i\omega_{u+q}(t-\tau_{b1})}$$
[Equation 16]

$$S_c(t-\tau_{c1}) = \Sigma_{q=1}{}^m C_q e^{i(\omega_c + \omega_{r+q})(t-\tau_{c1})} = e^{i\omega_c(t-\tau_{c1})}$$
$$\Sigma_{q=1}{}^m C_q e^{i\omega_{r+q}(t-\tau_{c1})}$$
[Equation 17]

In operation S120 of FIG. 8, the UE 200 may acquire first phase difference information from reference signals that are received from the first transmitter pair. For example, the first transmitter pair may include the first transmitter 100A and the second transmitter 100B. A distance between transmitters included in the first transmitter pair may be less than a distance between transmitters included in the second transmitter pair, which is described below.

The UE 200 may calculate a phase difference between the first reference signal received from the first transmitter 100A and the second reference signal received from the second transmitter 100B. Hereinafter, a process of calculating, by the UE 200, the phase difference is described.

The UE 200 may convert the passband reference signal of Equations 15 and 16 to a baseband signal. The UE 200 may multiply a received signal by a factor for removing a carrier component (angular frequency $\omega_c$). For example, the UE 200 may remove the carrier component from the received first reference signal using Equation 19.

$$y_a(t) = e^{-i\omega_c(t-\epsilon)} \cdot S_a(t-\tau_{a1}) = e^{i\omega_c(\tau_{a1}-\epsilon)} \cdot \Sigma_{q=1}{}^m A_q$$
$$e^{i\omega_{v+q}(t-\tau_{a1})}$$
[Equation 18]

In Equation 18, $y_a(t)$ represents a result of converting the first reference signal received at the UE 200 to the baseband signal, and $\epsilon$ denotes a local clock error that occurs due to mismatch between a clock of a receiving (Rx) UE and a clock of a transmitting (Tx) base station.

$y_b(t)$ in which the second reference signal received at the UE 200 is converted to the baseband signal may be represented as Equation 19.

$$y_b(t) = e^{-i\omega_c(t-\epsilon)} \cdot S_b(t-\tau_{b1}) = e^{i\omega_c(\tau_{b1}-\epsilon)} \cdot \Sigma_{q=1}{}^m B_q$$
$$e^{i\omega_{u+q}(t-\tau_{b1})}$$
[Equation 19]

$y_c(t)$ in which the third reference signal received at the UE 200 is converted to the baseband signal may be represented as Equation 20.

$$y_c(t) = e^{-i\omega_c(t-\epsilon)} \cdot S_c(t-\tau_{c1}) = e^{i\omega_c(\tau_{c1}-\epsilon)} \cdot \Sigma_{q=1}{}^m C_q$$
$$e^{i\omega_{r+q}(t-\tau_{c1})}$$
[Equation 20]

The baseband signal acquired by collecting the reference signal of Equation 18 as N sample sequences may be expressed as a vector of Equation 21. In a typical OFDM system, N may be determined based on a size of an FFT window.

$$Y_a(t) = \begin{bmatrix} y_a(t) \\ y_a(t-1) \\ \vdots \\ y_a(t-N+1) \end{bmatrix} = \begin{bmatrix} e^{-i\omega_c(t-\epsilon)} \cdot s_a(t) \\ e^{-i\omega_c(t-1-\epsilon)} \cdot s_a(t-1) \\ \vdots \\ e^{-i\omega_c(t-N-\epsilon)} \cdot s_a(t-N+1) \end{bmatrix}$$
[Equation 21]

The UE 200 may acquire a sample vector by converting signals received at a plurality of points in times to baseband signals. For example, the UE 200 may extract a sample vector by converting signals received at N points in times to baseband signals. In the typical OFDM system, a value of N may be determined based on the size of the FFT window. If a waveform of a reference signal continues during a plurality of symbol periods, the UE 200 may easily acquire a plurality of sample vectors by shifting t of Equation 21 without considering a boundary between symbols.

The UE 200 may calculate a first phase vector from a first sample vector $Y_a(t)$ that is acquired from the first reference signal. Hereinafter, a process of calculating, by the UE 200, the first phase vector is described.

Conjugated complex exponentiation coefficients of subcarrier k corresponding to N sample times may be presented as a vector of Equation 22.

$$DFT_k(t-\epsilon) = [e^{-i\omega_k(t-\epsilon)} e^{-i\omega_k(t-1-\epsilon)} e^{-i\omega_k(t-2-\epsilon)} \ldots$$
$$e^{-i\omega_k(t-N+1-\epsilon)}]$$
[Equation 22]

In Equation 22, $DFT_k(t-\epsilon)$ denotes a discrete Fourier transform (DFT) coefficient vector used for an FFT operation of a $k^{th}$ subcarrier having an angular frequency $\omega_k$, and $\epsilon$ denotes a local clock error that occurs due to mismatch between a clock of an Rx UE and a clock of a transmitter. Components of the DFT coefficient vector may rotate on the complex plane according to an increase in $t-\epsilon$.

The UE 200 may perform an inner product of the first sample vector shown in Equation 21 and the DFT coefficient vector shown in Equation 22. The UE 200 may extract a phase of each of subcarrier components by performing the above inner product operation. The Rx UE may calculate a sum of result values acquired by multiplying each of components of the DFT coefficient vector by each of components of the sample vector through the inner product.

The aforementioned operation process may be represented as Equation 23.

$$Y_k = DFT_k(t-\epsilon) \cdot \begin{bmatrix} y_a(t) \\ y_a(t-1) \\ \vdots \\ y_a(t-N+1) \end{bmatrix} =$$

$$\sum_{n=0}^{N-1} y_a(t-n) e^{-i\omega_k(t-n-\epsilon)} = N \cdot A_k e^{-i(\omega_c + \omega_k)(\tau-\epsilon)} + \sigma_a$$

$$\sigma_a = \sum_{n=0}^{N-1} \sum_{q=1}^{m, q \neq k} A_q e^{i((\omega_q - \omega_k)(t-n) - \omega_q \tau + \omega_k \epsilon)} \approx 0$$
[Equation 23]

In Equation 23, $Y_k$ denotes an inner product result acquired by performing an inner product of the first sample vector and the DFT coefficient vector. Referring to Equation 23, the inner product result of the first sample vector and the DFT coefficient vector may be represented as a sum of error component $\sigma_a$ and $N \cdot A_k e^{-i(\omega_c + w_k)(\tau - \epsilon)}$ that corresponds to the subcarrier k and is independent at a time t. Here, $\sigma_a$ may degrade positioning precision by acting as an interference component caused by noise and other orthogonal subcarrier components. The UE 200 may ignore $\sigma_a$ through convergence thereof to 0 by averaging values calculated by collecting a plurality of samples. To this end, the UE 200 may acquire a plurality of sample vectors by shifting a start point t of a time interval of the sample vector. If a waveform of a reference signal continues during a plurality of symbol periods, the UE 200 may easily acquire the plurality of sample vectors.

In the aforementioned description, only the $k^{th}$ subcarrier signal having the angular frequency $\omega_k$ is considered. If the first subcarrier group of the first reference signal transmitted from the first transmitter 100A includes a subcarrier group having angular frequencies of $\omega_{v+1} \sim \omega_{v+m}$, Equation 23 may be generalized to Equation 24.

$$\mathbb{Y}_A = \begin{bmatrix} Y_{v+1} \\ Y_{v+2} \\ \vdots \\ Y_{v+m} \end{bmatrix} = \begin{bmatrix} DFT_{v+1}(t-\epsilon) \\ DFT_{v+2}(t-\epsilon) \\ \vdots \\ DFT_{v+m}(t-\epsilon) \end{bmatrix} \cdot \begin{bmatrix} y_a(t) \\ y_a(t-1) \\ \vdots \\ y_a(t-N+1) \end{bmatrix} =$$ [Equation 24]

$$N \cdot \begin{bmatrix} A_1 e^{-i(\omega_c+\omega_{v+1})(\tau_{a1}-\epsilon)} \\ A_2 e^{-i(\omega_c+\omega_{v+2})(\tau_{a1}-\epsilon)} \\ \vdots \\ A_m e^{-i(\omega_c+\omega_{v+m})(\tau_{a1}-\epsilon)} \end{bmatrix} + \sigma_A$$

In Equation 24, each of $Y_{v+1}$, $Y_{v+2}$, $Y_{v+m}$ represents an inner product result between the first sample vector and the DFT coefficient vector acquired by Equation 22. $\mathbb{Y}_A$ denotes a vector that includes $Y_{v+1}$, $Y_{v+2}$ m ... $Y_{v+m}$. For example, $\mathbb{Y}_A$ may be referred to as a first phase vector. Also, $\sigma_A$ denotes an error vector. A phase of components of the phase vector $\mathbb{Y}_A$ may be proportional to a multiplication of a propagation delay time $\tau_{a1}$ and $(\omega_c+\omega_{v+k})$ that is a sum of an angular frequency of a carrier and an angular frequency of a subcarrier.

A process of calculating, by the UE 200, the first phase vector from the first reference signal received from the first transmitter 100A is described above by referring to Equation 21 to Equation 24. In a similar manner, the UE 200 may calculate a second phase vector from the second reference signal received from the second transmitter 100B. The second phase vector may be represented as Equation 25.

$$\mathbb{Y}_B = \begin{bmatrix} Y_{u+1} \\ Y_{u+2} \\ \vdots \\ Y_{u+m} \end{bmatrix} = \begin{bmatrix} DFT_{u+1}(t-\epsilon) \\ DFT_{u+2}(t-\epsilon) \\ \vdots \\ DFT_{u+m}(t-\epsilon) \end{bmatrix} \cdot \begin{bmatrix} y_b(t) \\ y_b(t-1) \\ \vdots \\ y_b(t-N+1) \end{bmatrix} =$$ [Equation 25]

$$N \cdot \begin{bmatrix} B_1 e^{-i(\omega_c+\omega_{u+1})(\tau_{b1}-\epsilon)} \\ B_2 e^{-i(\omega_c+\omega_{u+2})(\tau_{b1}-\epsilon)} \\ \vdots \\ B_m e^{-i(\omega_c+\omega_{u+m})(\tau_{b1}-\epsilon)} \end{bmatrix} + \sigma_B$$

In Equation 25, $\mathbb{Y}_B$ may be referred as a second phase vector and $\sigma_B$ denotes an error vector. A phase of components of the phase vector $\mathbb{Y}_B$ may be proportional to a multiplication of a propagation delay time $\tau_{b1}$ and $(\omega_c+\omega_{u+k})$ that is a sum of an angular frequency of a carrier and an angular frequency of a subcarrier.

The UE 200 may calculate a third phase vector from the third reference signal received from the third transmitter 100C.

$$\mathbb{Y}_C = \begin{bmatrix} Y_{r+1} \\ Y_{r+2} \\ \vdots \\ Y_{r+m} \end{bmatrix} = \begin{bmatrix} DFT_{r+1}(t-\epsilon) \\ DFT_{r+2}(t-\epsilon) \\ \vdots \\ DFT_{r+m}(t-\epsilon) \end{bmatrix} \cdot \begin{bmatrix} y_c(t) \\ y_c(t-1) \\ \vdots \\ y_c(t-N+1) \end{bmatrix} =$$ [Equation 26]

$$N \cdot \begin{bmatrix} C_1 e^{-i(\omega_c+\omega_{r+1})(\tau_{c1}-\epsilon)} \\ C_2 e^{-i(\omega_c+\omega_{r+2})(\tau_{c1}-\epsilon)} \\ \vdots \\ C_m e^{-i(\omega_c+\omega_{r+m})(\tau_{c1}-\epsilon)} \end{bmatrix} + \sigma_C$$

In Equation 26, $\mathbb{Y}_C$ may be referred to as a third phase vector and $\sigma_C$ denotes an error vector.

Referring to FIG. 2, when the UE 200 receives reference signals from at least four transmitters, the UE 200 may further calculate a fourth phase vector.

The UE 200 may calculate a first phase difference. The UE 200 may calculate a phase difference between the first reference signal and the second reference signal using the first phase vector and the second phase vector. The UE 200 may calculate a conjugate product between the first phase vector and the second phase vector. Here, the conjugate product between the first phase vector and the second phase vector may be represented as Equation 27.

[Equation 27]

$$\mathbb{Y}_A \mathbb{Y}_B^* =$$

$$N \cdot \begin{bmatrix} A_1 e^{-i(\omega_c+\omega_{v+1})(\tau_{a1}-\epsilon)} \\ A_2 e^{-i(\omega_c+\omega_{v+2})(\tau_{a1}-\epsilon)} \\ \vdots \\ A_m e^{-i(\omega_c+\omega_{v+m})(\tau_{a1}-\epsilon)} \end{bmatrix} \cdot N \cdot \begin{bmatrix} B_1^* e^{i(\omega_c+\omega_{u+1})(\tau_{b1}-\epsilon)} \\ B_2^* e^{i(\omega_c+\omega_{u+2})(\tau_{b1}-\epsilon)} \\ \vdots \\ B_m^* e^{i(\omega_c+\omega_{u+m})(\tau_{b1}-\epsilon)} \end{bmatrix} =$$

$$N^2 \cdot \begin{bmatrix} A_1 B_1^* e^{i(\omega_c+\omega_{u-v+1})(\tau_{b1}-\tau_{a1})} \\ A_2 B_2^* e^{i(\omega_c+\omega_{u-v+2})(\tau_{b1}-\tau_{a1})} \\ \vdots \\ A_m B_m^* e^{i(\omega_c+\omega_{u-v+m})(\tau_{b1}-\tau_{a1})} \end{bmatrix}$$

In Equation 27, $\omega_c$ denotes an angular frequency of a carrier. The angular frequency $\omega_c$ of the carrier may be significantly greater than $\omega_{u-v+k}$ that is an angular frequency difference between subcarriers. Therefore, Equation 27 may be simplified as Equation 28.

$$\mathbb{Y}_A \mathbb{Y}_B^* = N^2 \cdot \begin{bmatrix} A_1 B_1^* e^{i(\omega_c+\omega_{u-v+1})(\tau_{b1}-\tau_{a1})} \\ A_2 B_2^* e^{i(\omega_c+\omega_{u-v+2})(\tau_{b1}-\tau_{a1})} \\ \vdots \\ A_m B_m^* e^{i(\omega_c+\omega_{u-v+m})(\tau_{b1}-\tau_{a1})} \end{bmatrix} \approx$$ [Equation 28]

$$N^2 \cdot \begin{bmatrix} A_1 B_1^* e^{i\omega_c(\tau_{b1}-\tau_{a1})} \\ A_2 B_2^* e^{i\omega_c(\tau_{b1}-\tau_{a1})} \\ \vdots \\ A_m B_m^* e^{i\omega_c(\tau_{b1}-\tau_{a1})} \end{bmatrix} = N^2 \cdot e^{i\omega_c(\tau_{b1}-\tau_{a1})}$$

The UE 200 may calculate a phase difference depending on a wavelength of a carrier by applying an angle function of extracting an exponentiation value to $\mathbb{Y}_A \mathbb{Y}_B^*$ that is a conjugate product value of Equation 28.

The UE 200 may calculate phase difference information using Equation 29.

$$\text{angle}(\mathbb{Y}_A \mathbb{Y}_B^*) = \omega_c(\tau_{b1}-\tau_{a1}) = \theta_{ab}$$ [Equation 29]

In Equation 29, $\theta_{ab}$ denotes phase difference information between the first reference signal and the second reference signal, $(\tau_{b1}-\tau_{a1})$ denotes a difference between a travel time of the first reference signal and a travel time of the second reference signal, $\omega_c$ denotes an angular frequency corresponding to a carrier, and the angle function denotes a function that outputs a phase angle of a complex component. A codomain of the angle function is $-\pi \sim +\pi$ (or $0 \sim 2\pi$).

Referring to Equation 29, the UE 200 may calculate a phase difference $\theta_{ab}$ depending on $(\tau_{b1}-\tau_{a1})$ and $\omega_c$ from the first phase vector and the second phase vector.

In operation S130 of FIG. 4, the UE 200 may acquire second phase difference information. The UE 200 may acquire second phase difference information based on reference signals received from the second transmitter pair. For example, the second transmitter pair may include the first transmitter 100A and the third transmitter 100C. As another example, the second transmitter pair may include the second transmitter 100A and the third transmitter 100C.

For example, the UE 200 may calculate a second phase difference based on the first reference signal from the first transmitter 100A and the third reference signal received from the third transmitter 100B. The UE 200 may calculate the second phase difference using Equation 30.

$$\text{angle}(\mathbb{Y}_A \mathbb{Y}_C^*) = \omega_c(\tau_{c1} - \tau_{a1}) = \theta_{ac} \quad \text{[Equation 30]}$$

In Equation 29 and Equation 30, the codomain of the angle function is $-\pi \sim +\pi$ (or $0 \sim 2\pi$). Therefore, an actual phase difference may differ from an output value of the angle function by an integer multiple of $2\pi$ and an integer ambiguity issue may occur accordingly.

As a distance between transmitters decreases, the integer ambiguity range may decrease. As the distance between transmitters decreases, a difference in travel distance between reference signals decreases and accordingly, the integer ambiguity range may decrease. When the distance between the transmitters is sufficiently small, the phase difference Bab may be within the range of $-\pi \sim +\pi$ (or $0 \sim 2\pi$) that is the codomain of the angle function. In this case, the integer ambiguity issue may not occur.

Figure 9:
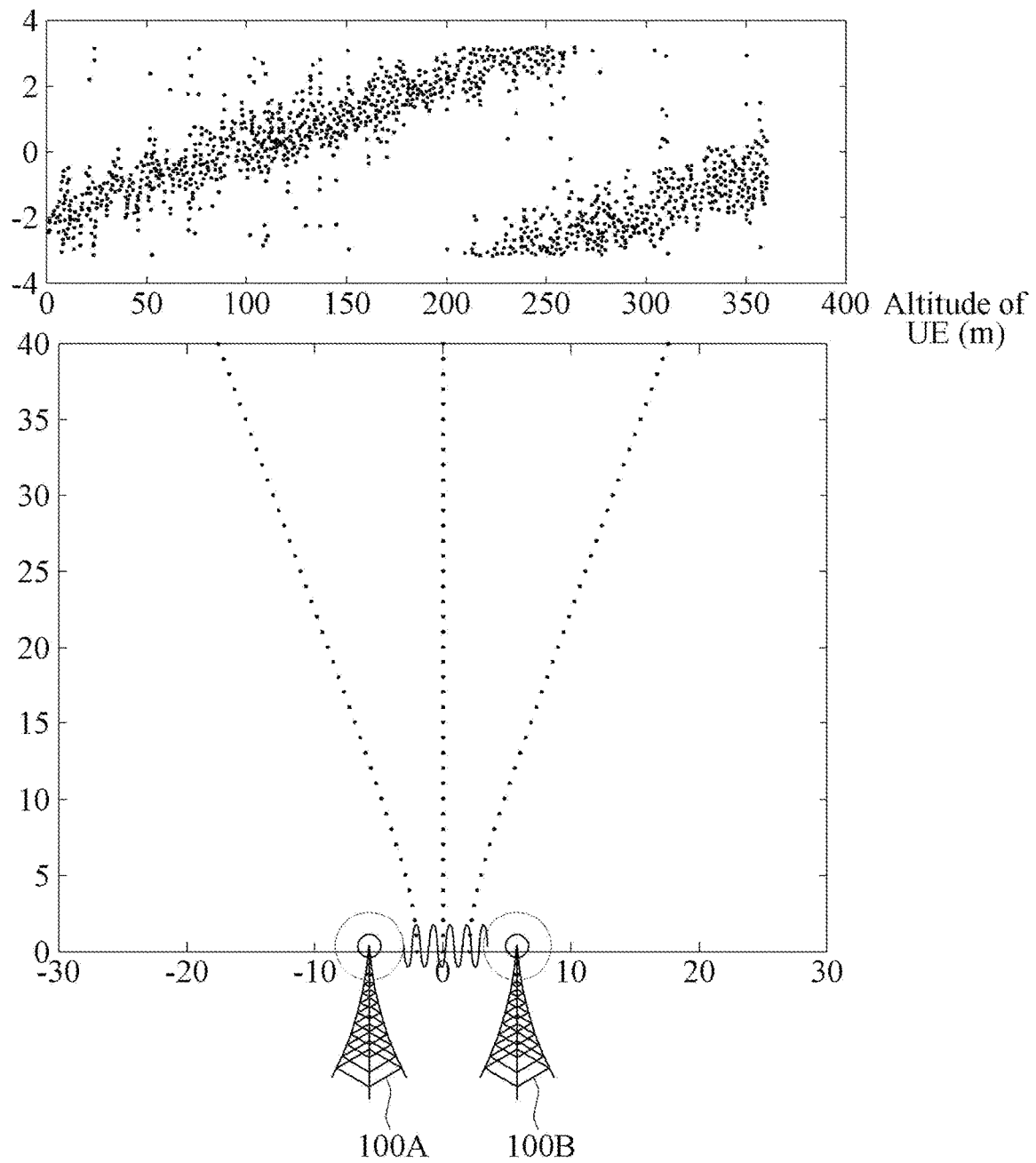
FIG. 9 illustrates an example of a relationship between a first phase difference acquired from a first transmitter pair and an altitude of a UE according to at least one example embodiment.

FIG. 9 illustrates an example of a relationship between the first phase difference acquired from the first transmitter pair and an altitude of the UE 200 according to an example embodiment. In an upper graph of FIG. 9, a horizontal axis denotes a phase difference and a vertical axis denotes the altitude of the UE 200.

Referring to FIG. 9, when a distance between the first transmitter 100A and the second transmitter 100B that belong to the first transmitter pair is 10 m, the phase difference does not greatly vary while the altitude of the UE 200 changes from 0 m to 350 m and accordingly, one of 0 and 1 may be selected as the integer ambiguity. Referring to FIG. 9, when a distance between transmitters belonging to a transmitter pair is relatively small, it may be relatively easy to determine the integer ambiguity. On the contrary, since the change amount of the phase difference according to the altitude of the UE 200 is relatively small, an error caused by surrounding environment and thermal noise may be great. Therefore, the precision of measuring the altitude of the UE 200 may be relatively degraded.

Figure 10:
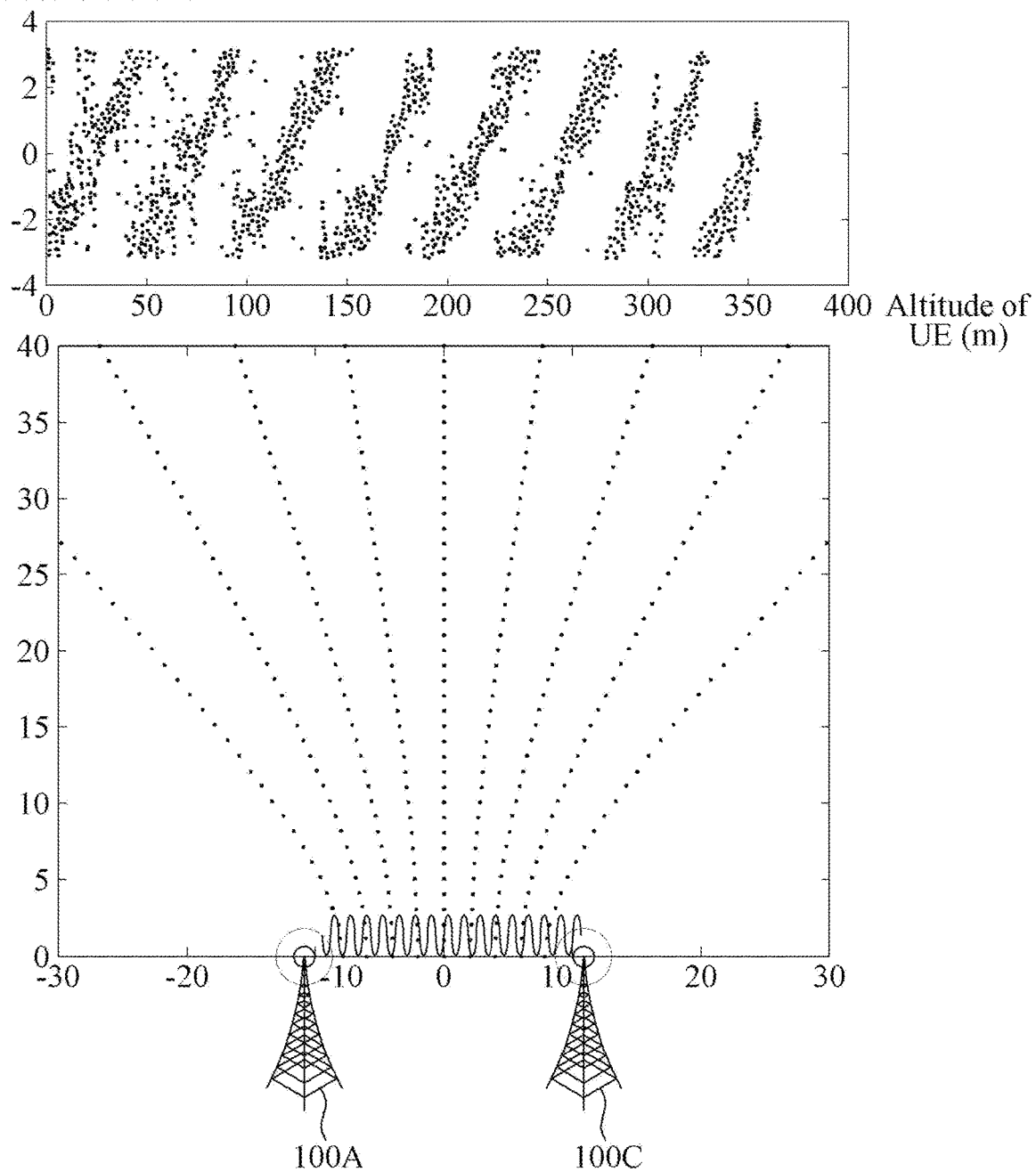
FIG. 10 illustrates an example of a relationship between a second phase difference acquired from a second transmitter pair and an altitude of a UE according to at least one example embodiment.

FIG. 10 illustrates an example of a relationship between the second phase difference acquired from the second transmitter pair and an altitude of the UE 200 according to an example embodiment. In an upper graph of FIG. 10, a horizontal axis denotes a phase difference and a vertical axis denotes the altitude of the UE 200.

Referring to FIG. 10, when a distance between the first transmitter 100A and the third transmitter 100C that belong to the second transmitter pair is 20 m, the phase difference greatly varies while the altitude of the UE 200 changes from 0 m to 350 m and accordingly, one of $-3, -2, -1, 0, 1, 2$, and 3 may be selected as the integer ambiguity. Referring to FIG. 10, when a distance between transmitters belonging to a transmitter pair is relatively great, it may be relatively difficult to determine the integer ambiguity. On the contrary, since the change amount of the phase difference according to the altitude of the UE 200 is relatively great, an error caused by surrounding environment and thermal noise may be small. Therefore, the precision of measuring the altitude of the UE 200 may be relatively improved.

When horizontal distances between the transmitters, for example, the first transmitter 100A, the second transmitter 100B, and the third transmitter 100C, and the UE 200 are sufficiently great, a phase difference between reference signals may be substantially linearly proportional to the altitude of the UE 200.

Therefore, a relationship between the first phase difference and the altitude of the UE 200 may be represented as Equation 31.

$$h_1 = \kappa_{a1} \cdot \theta_{ab} + \kappa_{a2} \quad \text{[Equation 31]}$$

In Equation 31, $h_1$ denotes a first altitude of the UE 200 that is calculated based on the first phase difference, $\theta_{ab}$ denotes the first phase difference, and $\kappa_{a1}$ and $\kappa_{a2}$ denote a first conversion coefficient pair for a linear relationship between the first phase difference and the altitude of the UE 200.

In Equation 31, $\theta_{ab}$ denotes a value acquired by adding an output value of the angle function acquired using Equation 29 and $2\pi^* N_1$ that is a modification value according to integer ambiguity. Here, $N_1$ denotes integer ambiguity of the first phase difference and is also referred to as first integer ambiguity.

A relationship between the second phase difference and the altitude of the UE 200 may be represented as Equation 32.

$$h_2 = \kappa_{b1} \cdot \theta_{ac} + \kappa_{b2} \quad \text{[Equation 32]}$$

In Equation 32, $h_2$ denotes a second altitude of the UE 200 that is calculated based on the first phase difference, $\theta_{ac}$ denotes the second phase difference, and $\kappa_{b1}$ and $\kappa_{b2}$ denote a second conversion coefficient pair for a linear relationship between the second phase difference and the altitude of the UE 200.

In Equation 32, $\theta_{ac}$ denotes a value acquired by adding an output value of the angle function acquired using Equation 30 and $2\pi^* N_2$ that is a modification value according to integer ambiguity. Here, $N_2$ denotes integer ambiguity of the second phase difference and is also referred to as second integer ambiguity.

When the UE 200 may calculate the first conversion coefficient set ($\kappa_{a1}$ and $\kappa_{a2}$) and the second conversion coefficient set ($\kappa_{b1}$ and $\kappa_{b2}$), the UE 200 may calculate the altitude of the UE 200 using Equation 31 and Equation 32.

To this end, the UE 200 may pre-store information of the first conversion coefficient set ($\kappa_{a1}$ and $\kappa_{a2}$) and the second conversion coefficient set ($\kappa_{b1}$ and $\kappa_{b2}$) that are set for each of a plurality of reference points.

Figure 11:
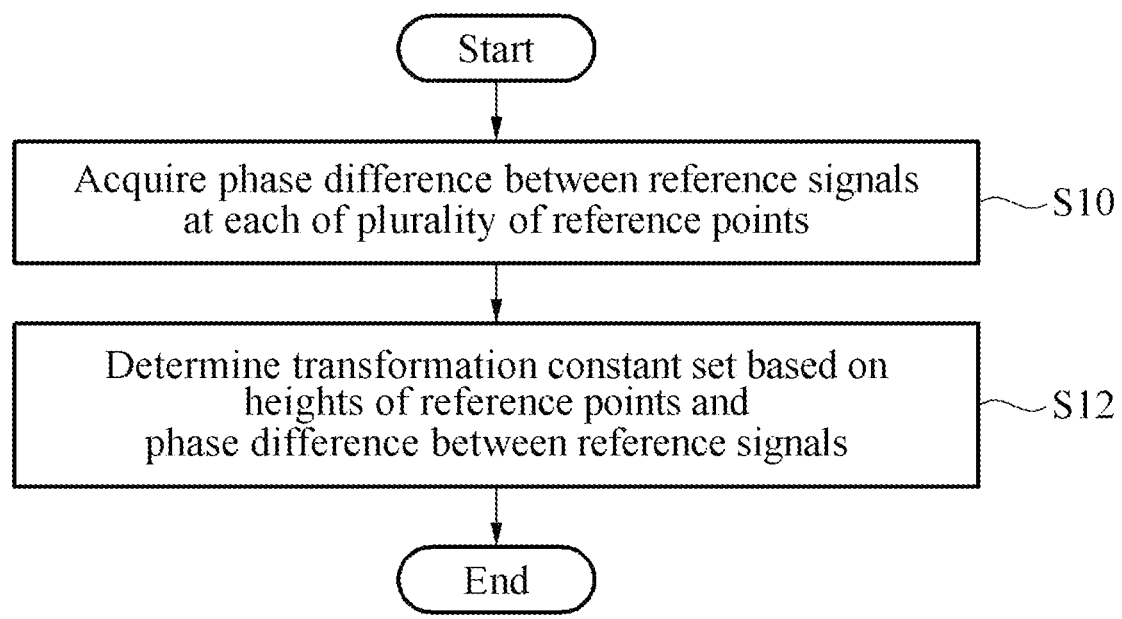
FIG. 11 is a flowchart illustrating a process of determining a first conversion coefficient set and a second conversion coefficient set according to at least one example embodiment.

FIG. 11 is a flowchart illustrating a process of determining a first conversion coefficient set and a second conversion coefficient set according to at least one example embodiment.

Referring to 11, in operation S10, a computing apparatus may acquire information about a phase difference between reference signals at each of a plurality of reference points. Here, the computing apparatus may include at least one of the UE 200, a base station, and a third apparatus that supports positioning of the UE 200. The reference points may include a plurality of horizontal coordinates. The computing apparatus may calculate a change in a first phase difference according to a change in the altitude for each of the reference points based on a simulation. Likewise, the computing apparatus may calculate a change in a second phase difference according to a change in the altitude for each of the reference points based on the simulation. As another example, the computing apparatus may also acquire data of the first phase difference or the second phase difference acquired through actual measurement performed at each of the reference points.

In operation S12, the computing apparatus may acquire the first conversion coefficient set that represents a relationship between the first phase difference and the altitude at each of the reference points based on data acquired through calculation or actual measurement. Also, the computing apparatus may acquire the second conversion coefficient set that represents a relationship between the second phase difference and the altitude at each of the reference points based on data acquired through calculation or actual measurement.

Referring again to FIG. 8, in operation S140, the UE 200 may calculate a first position coordinate based on the first conversion coefficient set ($\kappa_{a1}$ and $\kappa_{a2}$) and the first phase difference ($\theta_{ab}$). For example, the UE 200 may use the first conversion coefficient set corresponding to a reference point closest to a horizontal position of the UE 200. As another example, the UE 200 may also determine a first conversion coefficient to be applied to Equation 31 based on first conversion coefficient sets corresponding to reference points closest to the horizontal position of the UE 200. Since a distance between transmitters belonging to the first transmitter pair is relatively small, the UE 200 may easily estimate the first integer ambiguity $N_1$. The UE 200 may calculate a first position coordinate based on the first phase difference $\theta_{ab}$ to which the first integer ambiguity $N_1$ is applied. The UE 200 may calculate the first position coordinate using Equation 31. The first position coordinate may include information about the first altitude $h_1$ that is calculated based on the first phase difference.

In operation S150, the UE 200 may calculate the second integer ambiguity $N_2$.

Figure 12:
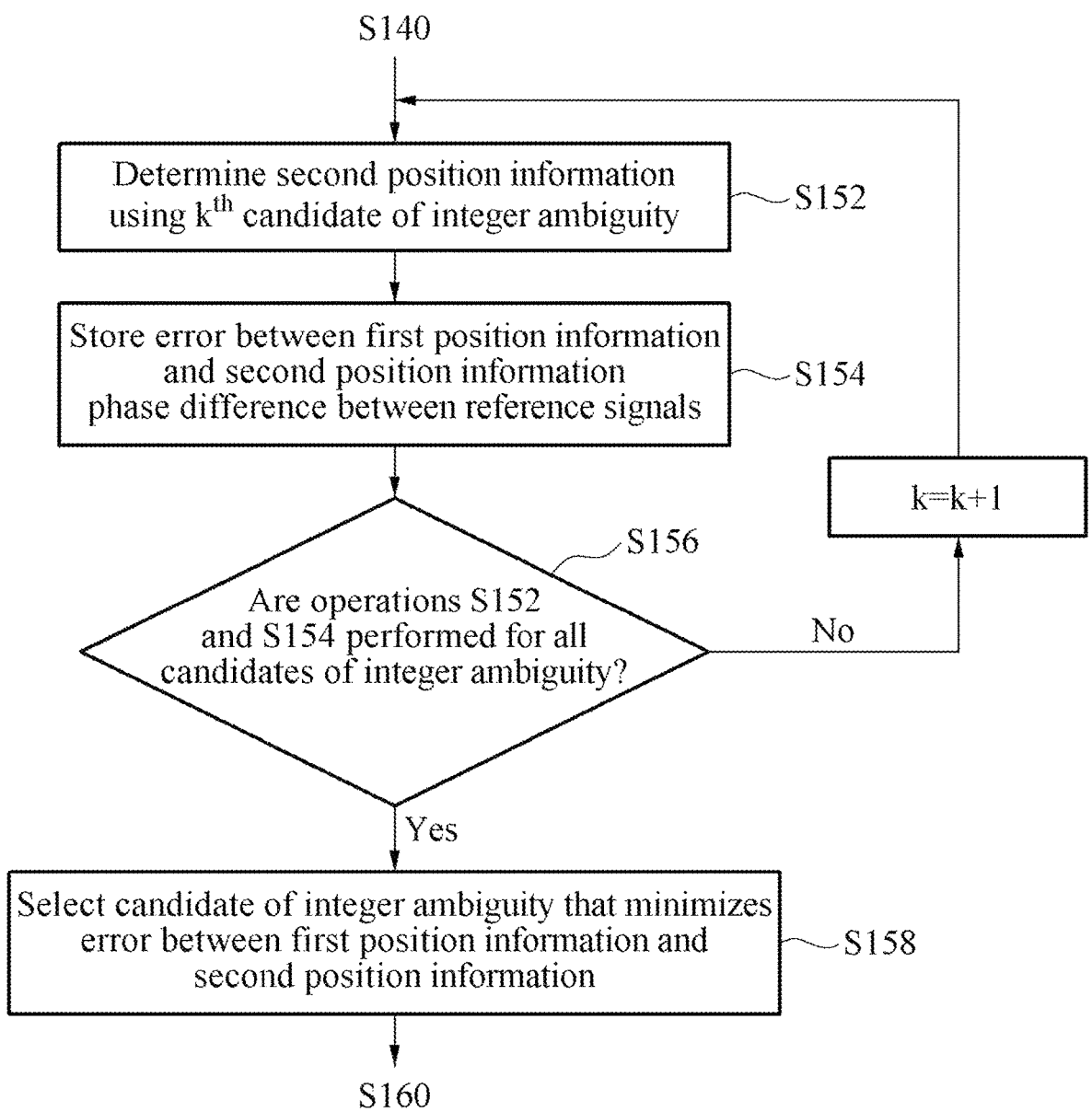
FIG. 12 is a flowchart illustrating an example of a process of performing operation S150 of FIG. 8.

FIG. 12 is a flowchart illustrating an example of a process of performing operation S150 of FIG. 8.

Referring to FIG. 12, in operation S152, the UE 200 may determine a second phase difference $\theta_{ac}$ using a $k^{th}$ candidate value among candidates of the second integer ambiguity (e.g., −3, −2, −1, 0, 1, 2, and 3 in FIG. 10). The UE 200 may generate a second position coordinate using the second phase difference $\theta_{ac}$ and a second conversion coefficient set ($\kappa_{b1}$ and $\kappa_{b2}$) to which $k^{th}$ second integer ambiguity is applied. The second position coordinate may include information about the second altitude $h_2$ that is calculated based on the second phase difference $\theta_{ac}$.

In operation S154, the UE 200 may calculate and store a difference between the first altitude $h_1$ and the second altitude $h_2$.

In operation S156, the UE 200 may determine whether operations S152 and S154 are performed for all the candidates of integer ambiguity. When calculation of the difference between the first altitude $h_1$ and the second altitude $h_2$ is completed for all the candidates of integer ambiguity, the UE 200 may determine a candidate of integer ambiguity that minimizes the difference between the first altitude $h_1$ and the second altitude $h_2$ as the second integer ambiguity in operation S158.

Referring again to FIG. 8, in operation S160, the UE 200 may determine the second phase difference $\theta_{ac}$ based on the second integer ambiguity determined in operation S150. The UE 200 may apply the altitude of the UE 200 calculated based on the second phase difference $\theta_{ac}$ and the second conversion coefficient set ($\kappa_{b1}$ and $\kappa_{b2}$) to a position coordinate of the UE 200.

An improved vertical positioning method and apparatus according to example embodiments is described above with reference to FIGS. 1 to 12. According to at least one example embodiment, the UE 200 may accurately calculate an altitude of the UE 200 using a first position coordinate calculated based on a first phase difference and a second position coordinate calculated based on a second phase difference. According to at least one example embodiment, the UE 200 may easily determine second integer ambiguity for the second phase difference through comparison between the first position coordinate and the second position coordinate. According to at least one example embodiment, the UE 200 may easily calculate a phase difference between reference signals by acquiring a sample vector and by acquiring a phase vector from the sample vector.

One of ordinary skill in the art may easily understand that the methods and/or processes and operations described herein may be implemented using hardware components, software components, and/or a combination thereof based on the example embodiments. For example, the hardware components may include a general-purpose computer and/or exclusive computing device or a specific computing device or a special feature or component of the specific computing device. The processes may be implemented using one or more processors having an internal and/or external memory, for example, a microprocessor, a controller such as a microcontroller and an embedded microcontroller, a microcomputer, an arithmetic logic unit (ALU), and a digital signal processor such as a programmable digital signal processor or other programmable devices. In addition, or, as an alternative, the processes may be implemented using an application specific integrated circuit (ASIC), a programmable gate array, such as, for example, a field programmable gate array (FPGA), a programmable logic unit (PLU), or a programmable array logic (PAL), and other devices capable of executing and responding to instructions in a defined manner, other devices configured to process electronic devices, and combinations thereof. The processing device may run an operating system (OS) and one or more software applications that run on the OS. Also, the processing device may access, store, manipulate, and create data in response to execution of the software. For purpose of simplicity, the description of a processing device is used as a singular; however, one skilled in the art will appreciate that a processing device may include a plurality of processing elements and/or multiple types of processing elements. For example, the processing device may include a plurality of processor or a single processor and a single controller. In addition, different processing configurations are possible such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable recording media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable recording media include magnetic media such as hard disks, floppy disks, and magnetic tape; optical media such as CD ROM, DVD, and blue-rays; magneto-optical media such as floptical disks; and hardware devices that are specially to store and perform program instructions, such as read-only memory (ROM), random access memory (RAM), flash memory, and the like. Examples of program instructions include both machine code, such as produced by a compiler and files containing structural programming languages such as C++ object-oriented programming language and high or low programming languages (assembly languages, hardware technical languages, database programming languages and techniques) to run on one of the aforementioned devices and a processor, a processor architecture, or a heterogeneous combination of combinations of different hardware and software components, or a machine capable of executing program instructions. Accordingly, they may include a machine language code, a byte code, and a high language code executable using an interpreter and the like.

Therefore, according to an aspect of at least one example embodiment, the aforementioned methods and combinations thereof may be implemented by one or more computing devices as an executable code that performs the respective operations. According to another aspect, the methods may be implemented by systems that perform the operations and may be distributed over a plurality of devices in various manners or all of the functions may be integrated into a single exclusive, stand-alone device, or different hardware. According to another aspect, devices that perform operations associated with the aforementioned processes may include the aforementioned hardware and/or software. According to another aspect, all of the sequences and combinations associated with the processes are to be included in the scope of the present disclosure.

For example, the described hardware devices may be to act as one or more software modules in order to perform the operations of the above-described example embodiments, or vice versa. The hardware devices may include a processor, such as, for example, an MPU, a CPU, a GPU, a TPU, etc., configured to be combined with a memory such as ROM/RAM configured to store program instructions and to execute the instructions stored in the memory, and may include a communicator capable of transmitting and receiving a signal with an external device. In addition, the hardware devices may include a keyboard, a mouse, and an external input device for receiving instructions created by developers.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Accordingly, the present disclosure is not limited to the aforementioned example embodiments and may belong to the scope of example embodiments disclosed herein and equally or equivalently modified from the claims. For examples, although the methods may be implemented in different sequence and/or components of systems, structures, apparatuses, circuits, etc., may be combined or integrated in different form or may be replaced with other components or equivalents, appropriate results may be achieved.

Such equally or equivalently modified example embodiments may include logically equivalent methods capable of achieving the same results according to the example embodiments. Accordingly, the present disclosure and the scope thereof are not limited to the aforementioned example embodiments and should be understood as a widest meaning allowable by law.

What is claimed is:

1. A positioning method performed by a user equipment, the positioning method comprising:
   receiving reference signals from at least three transmitters;
   calculating a first phase difference between reference signals received from transmitters that belong to a first transmitter pair;
   calculating a second phase difference between reference signals received from transmitters that belong to a second transmitter pair;
   calculating a first position coordinate based on a first conversion coefficient set and the first phase difference;
   determining an integer ambiguity of the second phase difference based on a second conversion coefficient set, the second phase difference, and the first position coordinate; and
   determining a position of the user equipment based on the integer ambiguity of the second phase difference.

2. The positioning method of claim 1, wherein a distance between the transmitters that belong to the first transmitter pair is less than a distance between the transmitters that belong to the second transmitter pair.

3. The positioning method of claim 2, wherein the determining the integer ambiguity of the second phase difference comprises:
   calculating second position coordinates based on the second conversion coefficient set and second phase differences corrected using a plurality of candidates of integer ambiguity;
   calculating a difference between each of the second position coordinates and the first position coordinate; and
   determining a candidate of integer ambiguity that minimizes a difference with the first position coordinate as the integer ambiguity of the second phase difference.

4. The positioning method of claim 1, wherein the first conversion coefficient set and the second conversion coefficient set are determined from conversion coefficient set information that is pre-stored to correspond to a plurality of reference points.

5. The positioning method of claim 4, wherein the first conversion coefficient set and the second conversion coefficient set are determined from conversion coefficient set information corresponding to at least one reference point adjacent to a horizontal coordinate of the user equipment among the plurality of reference points.

6. The positioning method of claim 1, wherein a waveform of each of the reference signals received from the at least three transmitters continue in at least one symbol boundary.

7. The positioning method of claim 6, wherein each of the reference signals received from the at least three transmitters include a subcarrier group that includes subcarriers provided at equal intervals in a frequency domain.

8. The positioning method of claim 1, wherein the calculating the first phase difference between the reference signals received from the transmitters that belong to the first transmitter pair comprises:
- acquiring first sample data based on received data of a first reference signal received from a first transmitter that belongs to the first transmitter pair and acquiring second sample data based on received data of a second reference signal received from a second transmitter that belongs to the first transmitter pair;
- calculating a first phase vector and a second phase vector by performing an inner product of a discrete Fourier transform (DFT) coefficient vector for each of the first sample vector and the second sample vector; and
- calculating the first phase difference based on the first phase vector and the second phase vector.

9. The positioning method of claim 8, wherein the first phase difference is calculated based on a conjugate product of the first phase vector and the second phase vector.

10. The positioning method of claim 1, wherein a change rate of the first phase difference according to an altitude of the user equipment is less than that of the second phase difference according to the altitude of the user equipment.

11. A user equipment comprising:
- a communicator configured to perform a process of receiving reference signals from at least three transmitters; and
- a processor configured to perform a process of calculating a first phase difference between reference signals received from transmitters that belong to a first transmitter pair, a process of calculating a second phase difference between reference signals received from transmitters that belong to a second transmitter pair, a process of calculating a first position coordinate based on a first conversion coefficient set and the first phase difference, a process of determining an integer ambiguity of the second phase difference based on a second conversion coefficient set, the second phase difference, and the first position coordinate, and a process of determining a position of the user equipment based on the integer ambiguity of the second phase difference.

12. The apparatus of claim 11, wherein a distance between the transmitters that belong to the first transmitter pair is less than a distance between the transmitters that belong to the second transmitter pair.

13. The apparatus of claim 12, wherein the process of determining the integer ambiguity of the second phase difference comprises:
- a process of calculating second position coordinates based on the second conversion coefficient set and second phase differences corrected using a plurality of candidates of integer ambiguity;
- a process of calculating a difference between each of the second position coordinates and the first position coordinate; and
- a process of determining a candidate of integer ambiguity that minimizes a difference with the first position coordinate as the integer ambiguity of the second phase difference.

14. The apparatus of claim 11, wherein the first conversion coefficient set and the second conversion coefficient set are determined from conversion coefficient set information that is pre-stored to correspond to a plurality of reference points.

15. The apparatus of claim 14, wherein the first conversion coefficient set and the second conversion coefficient set are determined from conversion coefficient set information corresponding to at least one reference point adjacent to a horizontal coordinate of the user equipment among the plurality of reference points.

16. The apparatus of claim 11, wherein a waveform of each of the reference signals received from the at least three transmitters continue in at least one symbol boundary.

17. The apparatus of claim 16, wherein each of the reference signals received from the at least three transmitters include a subcarrier group that includes subcarriers provided at equal intervals in a frequency domain.

18. The apparatus of claim 11, wherein the process of calculating the first phase difference between the reference signals received from the transmitters that belong to the first transmitter pair comprises:
- a process of acquiring first sample data based on received data of a first reference signal received from a first transmitter that belongs to the first transmitter pair and acquiring second sample data based on received data of a second reference signal received from a second transmitter that belongs to the first transmitter pair;
- a process of calculating a first phase vector and a second phase vector by performing an inner product of a discrete Fourier transform (DFT) coefficient vector for each of the first sample vector and the second sample vector; and
- a process of calculating the first phase difference based on the first phase vector and the second phase vector.

19. The apparatus of claim 18, wherein the first phase difference is calculated based on a conjugate product of the first phase vector and the second phase vector.

20. The apparatus of claim 11, wherein a change rate of the first phase difference according to an altitude of the user equipment is less than that of the second phase difference according to the altitude of the user equipment.

\* \* \* \* \*